US012801581B2

(12) United States Patent
Roberts et al.

(10) Patent No.: US 12,801,581 B2
(45) Date of Patent: *Nov. 17, 2026

(54) SYSTEM AND METHOD FOR ENRICHING AND NORMALIZING DATA

(71) Applicant: KPMG LLP, New York, NY (US)

(72) Inventors: Donald Preston Roberts, Charlotte, NC (US); Laurence Anthony Brown, Dallas, TX (US); Visal Nair, Orlando, FL (US)

(73) Assignee: KPMG LLP, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/766,437

(22) Filed: Jul. 8, 2024

(65) Prior Publication Data

US 2024/0362194 A1 Oct. 31, 2024

Related U.S. Application Data

(63) Continuation-in-part of application No. 18/752,109, filed on Jun. 24, 2024, which is a continuation of application No. 18/097,053, filed on Jan. 13, 2023, now Pat. No. 12,019,596, which is a continuation of application No. 17/675,192, filed on Feb. 18, 2022, now Pat. No. 11,556,510.

(60) Provisional application No. 63/512,304, filed on Jul. 7, 2023.

(51) Int. Cl.

| | |
|---|---|
| ***G06F 16/215*** | (2019.01) |
| ***G06F 16/23*** | (2019.01) |
| ***G06F 16/25*** | (2019.01) |

(52) U.S. Cl.
CPC ........ *G06F 16/215* (2019.01); *G06F 16/2379* (2019.01); *G06F 16/254* (2019.01)

(58) Field of Classification Search
CPC ... G06F 16/215; G06F 16/2379; G06F 16/254
USPC .......................................................... 707/602
See application file for complete search history.

(56) References Cited

U.S. PATENT DOCUMENTS

| | | | | |
|---|---|---|---|---|
| 6,092,086 A * | 7/2000 | Martin | G06F 16/27 | |
| 10,438,133 B2 * | 10/2019 | Vachhani | G06N 20/00 | |
| 2003/0191832 A1 * | 10/2003 | Satyavolu | G06F 16/958 | 707/E17.032 |
| 2004/0078423 A1 * | 4/2004 | Satyavolu | G06Q 10/10 | 715/234 |

(Continued)

*Primary Examiner* — Cam Linh T Nguyen
(74) *Attorney, Agent, or Firm* — Nelson Mullins Riley & Scarborough LLP; Anthony A. Laurentano

(57) ABSTRACT

A computer-implemented method for extracting bulk data by generating with a secure agent a transfer request for transfer of the bulk data; generating with a content management unit a bulk data extraction job having a job ID associated therewith in response to the transfer request and then transferring the job ID to the secure agent; generating a programmatic call using the job ID with the secure agent requesting data files including a manifest file; generating with the secure agent a search request for searching the manifest file for selected information; retrieving the manifest file with the content management unit in response to the search request; searching and parsing the manifest file with the content management unit to identify and retrieve the data files corresponding to the job ID; and transferring the data files associated with the job ID with the content management unit to a data extraction unit.

24 Claims, 15 Drawing Sheets

(56) References Cited

U.S. PATENT DOCUMENTS

| | | | | |
|---|---|---|---|---|
| 2013/0024440 | A1* | 1/2013 | Dimassimo | G06F 16/248 707/706 |
| 2013/0144605 | A1* | 6/2013 | Brager | G06F 40/40 704/9 |
| 2014/0250052 | A1* | 9/2014 | Lospinoso | G06N 5/048 706/59 |
| 2015/0095303 | A1* | 4/2015 | Sonmez | G06N 5/003 707/707 |
| 2016/0125085 | A1* | 5/2016 | Vasudevan | G06F 16/9535 707/734 |
| 2018/0101533 | A1* | 4/2018 | Robichaud | G06Q 10/10 |
| 2019/0188584 | A1* | 6/2019 | Rao | G06N 20/00 |
| 2021/0342920 | A1* | 11/2021 | Keck | G06F 16/9535 |
| 2022/0050838 | A1* | 2/2022 | Piatetsky | G06F 16/2455 |

* cited by examiner

SYSTEM AND METHOD FOR ENRICHING AND NORMALIZING DATA

RELATED APPLICATIONS

The present application claims priority to U.S. provisional patent application Ser. No. 63/512,304, filed Jul. 7, 2023, and entitled System And Method For Enriching and Normalizing Data, and is a continuation-in-part patent application of, and claims priority to, U.S. patent application Ser. No. 18/752,109, filed on Jun. 24, 2024, and entitled, System And Method For Enriching and Normalizing Data, which is a continuation patent application of U.S. patent application Ser. No. 18/097,053, filed on Jan. 13, 2023, and entitled System And Method For Enriching and Normalizing Data, now U.S. Pat. No. 12,019,596, which is a continuation patent application of U.S. patent application Ser. No. 17/675,192, filed on Feb. 18, 2022, and entitled System And Method For Enriching and Normalizing Data, now U.S. Pat. No. 11,556,510, the contents of which are herein incorporated by reference.

BACKGROUND OF THE INVENTION

The present invention is directed to data aggregation and enrichment systems, and in particular is directed to systems and methods for aggregating, enriching and normalizing data.

Today, enterprises, such as companies, generate vast amounts of data during their normal business operations. The generated data typically includes many different types of data, including for example financial data, human resource data, customer-related data, environmental data, and the like. The generation of the vast amounts of data makes it challenging for companies to properly and efficiently capture, aggregate, organize and migrate the data so that the data can be efficiently and reliably migrated or transferred to a target system, and subsequently used in meaningful ways. Further, the generated data is typically stored in disparate systems across many different servers, which can be at physically remote locations. The data can be stored, for example, in different types of databases having different inherent structures for different purposes or applications. As such, the data when extracted from the different database types is inherently incompatible with each other.

Traditional methodologies exist for trying to capture, migrate and reconcile the different types of data extracted from the different database types. These methods include the brute force creation of specific software configured for translating the different types of data so as to be compatible with one or more different types of databases. A drawback of these types of methods includes the extensive resources and expertise that are required to create the software to translate the data. As such, enterprises inherently do not perform these types of activities except in limited situations because of the costs associated with this endeavor.

Other conventional methodologies include the use of common data models for creating and placing the data into a more uniform structure that has a defined set of attributes and entities. A drawback of this approach is that most databases do not employ common data models. Further, the meager few that do exist oftentimes do not employ a proper and complete set of identities and attributes that are needed for specific data generated by the enterprise. As such, the common data models themselves oftentimes require a relatively detailed degree of customization, which requires a high level of expertise and is hence resource intensive.

Conventional systems also suffer from significant drawbacks when it comes to easily and efficiently migrating data from one platform to another. The conventional systems have orally complex communication requirements that significantly hinder the ability to locate, aggregate, and efficiently migrate data.

SUMMARY OF THE INVENTION

The present invention is directed to a system for migrating bulk data from one system or platform to another system or platform. The system of the present invention provides for efficient and reliable communication between the data platforms to enable the reliable migration of bulk data. Furthermore, the system of the present invention provides for efficient preprocessing of the migrated bulk data, including the cleaning and transformation of the bulk data, such that the migrated bulk data can be easily cleaned, transformed and reconciled when migrated to a target system.

The data aggregation and normalization system of the present invention also enables a user to provide a data development and hosting platform in a cloud-native environment. The system of the invention can also employ a series of machine learning techniques (e.g., accelerators) and/or prediction and detection units that can process the data and extract and generate meaningful insights and predictions therefrom. The integrated platform provided by the system of the present invention allows the user to integrate together in a connected system multiple different data storage types and applications that generates data of different types, and an associated processing system that can process the different types of data, store the data in a common data model so as to normalize the data, determine the data lineage of the data, and then process the data using different types of techniques. For example, the cleaned and normalized data can be processed by one or more machine language techniques. Alternatively, the data can be processed by a prediction unit for generating meaningful insights and predictions or by an anomaly detection unit for detecting one or more anomalies in the data.

The present invention is also directed to a data aggregation and normalization system for aggregating data from disparate data sources, processing the data to clean the data and to normalize or standardize the data using one or more common data models, and then applying one or more discrete machine learning techniques or prediction units to the normalized data to provide data insights and predictions. The normalized data can also be processed by one or more reporting modules to provide one or more customized reports.

The present application is also directed to a computer-implemented data aggregation and enrichment system for enriching data. The system includes a plurality of data source subsystems for providing data. The data source subsystem can include a data storage infrastructure for storing and extracting the data from a plurality of data sources, a bulk data extraction unit for scheduling and controlling a bulk transfer of the data from the data storage infrastructure to form bulk data, and a storage subsystem having a storage element for storing the bulk data and a content management unit for managing and controlling the extraction of the bulk data and for controlling the storage of the bulk data in the storage element. The system further includes a data extraction unit having a secure agent for securely managing and controlling an exchange of the bulk data from the data storage infrastructure and for extracting selected portions of the bulk data from the plurality of data source subsystems to form extracted bulk data. The system still further includes a data storage unit for storing the extracted bulk data, a data preprocessing unit for processing and enriching the extracted bulk data to form cleaned bulk data that is stored in the data storage unit, and a reporting unit for generating one or more reports based on the cleaned bulk data having a selected reporting format. The plurality of data source subsystems can be configured to provide data that is generated by a plurality of different types of data systems that are managed by different types of software applications. Further, the bulk data extraction unit can include an intelligent subsystem for extracting the bulk data from the data storage infrastructure and for scheduling and running data extracts.

The secure agent generates a transfer request for transfer of the bulk data from the plurality of the data source subsystems, and in response to receiving the transfer request, the content management unit generates a bulk data extraction job for transfer of the bulk data having job identification (ID) information associated therewith, and then transfers the job ID information to the secure agent. The secure agent generates a programmatic call operation using the job ID information requesting a plurality of data files including a manifest file corresponding to the bulk data from one or more of the data source subsystems. The secure agent also generates a search request for searching the manifest file for selected types of information, and in response to the search request, the content management unit retrieves the manifest file from the bulk data extraction unit. The content management unit can be configured to search and to parse the manifest file to identify and to retrieve the plurality of data files corresponding to the job ID information, and then transfer the plurality of data files corresponding to the job ID information to the data extraction unit.

The data preprocessing unit can include a data cleaning unit for cleaning the extracted bulk data to form cleaned bulk data, a common data model unit for inserting the cleaned bulk data into a common data model to normalize the cleaned bulk data, an assessment unit for assessing a quality of the cleaned bulk data in the common data model, a machine language module having a plurality of predefined machine learning units for applying one or more selected machine learning techniques to selected portions of the cleaned bulk data to form machine language data, and a transformation unit for transforming the machine language data into the selected reporting format. The data preprocessing unit can also include a data profiling and cleaning unit for profiling and cleaning the extracted bulk data and for generating cleaned bulk data, a data conversion and transformation unit for converting and transforming the cleaned bulk data into a format suitable for loading into a target system and for generating transformed data, and a data reconciliation unit for reconciling the extracted bulk data with the transformed data loaded into the target system. The data preprocessing unit can further include a machine language module having a plurality of predefined machine learning units for applying one or more selected machine learning techniques to selected portions of the bulk data to form machine language data.

The cleaned bulk data includes transaction data, product data, and user data, where the machine language module further comprises a prediction unit for processing the transaction data and the user data and generating a prediction based on an interest in one or more selected products of a selected user. The prediction unit can include a filter unit for processing the transaction data and the user data and for generating a product interest score indicative of the interest in the one or more selected products by the selected user. The filter unit includes a pattern filter unit for identifying from the transactional data a set of users having similar product preferences to the selected user and for generating based thereon a first product interest score indicative of a first interest level in the product by the selected user, and a neuro pattern filter unit for identifying from the transactional data and the user data a set of users having similar product preferences to the selected user and for generating based thereon a second product interest score indicative of a second interest level in the product by the selected user. The prediction unit can also include a page rank unit for processing the product data and the user data and for generating therefrom a community interest score associated with the one or more selected products, a user feature extraction unit for processing the user data and for identifying and extracting one or more primary user features based on the user data having a user feature score associated therewith, a product feature extraction unit for processing the product data and for identifying and extracting one or more primary product features based on the product data having a product feature score associated therewith, a scoring unit for receiving and processing the first product interest score, the second product interest score, the community interest score, the user feature score, and the product feature score to determine therefrom a final product score indicative of the user interest in the one or more selected products, and a ranking unit for ranking the final product interest scores.

The machine language module comprises an anomaly detection unit for detecting one or more anomalies in the bulk data. The anomaly detection unit includes a segmentation unit for segmenting the cleaned bulk data into a plurality of data segments, an entropy determination unit for determining entropy values for each of the plurality of data segments and for determining a plurality of distributions of the entropy values, an entropy change determination unit for comparing each of the plurality of distributions of the entropy values with each of the remaining ones of the plurality of distributions of the entropy values and for determining therefrom a change in the entropy value of each of the plurality of data segments relative to each other to form a plurality of distributions of entropy change values, an entropy selection unit for analyzing and selecting one or more distributions of entropy change values that trend in an upward direction, wherein the entropy change values correspond to one or more anomalies, and a removal unit for identifying selected ones of the plurality of distributions of entropy change values that are identical to each other, clustering together the identical ones of the plurality of distributions of entropy change values, and then removing duplicates of the identical ones of the plurality of distributions of entropy change values.

The present invention is also directed to a computer-implemented method for enriching data with a data aggregation and enrichment system. The method includes providing a plurality of data source subsystems for providing data, where each of the plurality of data source subsystems includes a data storage infrastructure for storing and extracting the data from a plurality of data sources, a bulk data extraction unit for scheduling and controlling a bulk transfer of the data from the data storage infrastructure to form bulk data, and a storage subsystem having a storage element for storing the bulk data and a content management unit for managing and controlling the extraction of the bulk data and for controlling the storage of the bulk data in the storage element. The method also includes securely managing and controlling an exchange of the bulk data from the data storage infrastructure with a data extraction unit having a secure agent, and for extracting selected portions of the bulk data from the plurality of data source subsystems to form extracted bulk data, storing the extracted bulk data in a data storage unit, processing and enriching the extracted bulk data with a data preprocessing unit to form cleaned bulk data that is stored in the data storage unit, and generating one or more reports from the cleaned bulk data having a selected reporting format with a reporting unit.

The computer-implemented method also includes generating a transfer request with the secure agent for transferring the bulk data, in response to the transfer request, generating a bulk data extraction job having a job identification (ID) information associated therewith with the content management unit for transferring the bulk data, and then transferring the job ID information to the secure agent. The computer-implemented method also includes generating, with the secure agent, a programmatic call operation using the job ID information requesting a plurality of data files including a manifest file corresponding to the bulk data, as well as a search request for searching the manifest file for selected types of information. Still further, in response to the search request, retrieving the manifest file from the bulk data extraction unit with the content management unit. The computer-implemented further includes searching and parsing the manifest file, with the content management unit, to identify and retrieve the plurality of data files corresponding to the job ID information, and transferring the plurality of data files associated with the job ID information to the data extraction unit.

The computer-implemented method further comprises, with a data preprocessing unit, cleaning the extracted bulk data to form cleaned bulk data, inserting the cleaned bulk data into a common data model to normalize the cleaned bulk data, and assessing a quality of the cleaned bulk data in the common data model. The method also includes providing a plurality of predefined machine learning units for applying one or more selected machine learning techniques to selected portions of the cleaned bulk data to form machine language data, and transforming the machine language data into the selected reporting format. With the data preprocessing unit, profiling and cleaning the extracted bulk data and generating cleaned bulk data, converting and transforming the cleaned bulk data into a format suitable for loading into a target system and for generating transformed data, and reconciling the extracted bulk data with the transformed data loaded into the target system.

The present invention is further directed to a computer-implemented method for communicating information in a data enrichment system, where the data enrichment system includes a plurality of data source subsystems for providing data. Each of the plurality of data source subsystems includes a data storage infrastructure for storing and extracting the data from a plurality of data sources, a bulk data extraction unit for scheduling and controlling a bulk transfer of the data from the data storage infrastructure to form bulk data, and a storage subsystem having a storage element for storing the bulk data and a content management unit for managing and controlling the extraction of the bulk data and for controlling the storage of the bulk data in the storage element. The method of the invention includes extracting with a data extraction unit having a secure agent selected portions of the bulk data by generating, with the secure agent, a transfer request for transfer of the bulk data; generating, with the content management unit, a bulk data extraction job having a job identification (ID) information associated therewith in response to the transfer request and then transferring the job ID information to the secure agent; generating a programmatic call operation using the job ID information with the secure agent requesting a plurality of data files including a manifest file corresponding to the bulk data; generating with the secure agent a search request for searching the manifest file for selected types of information; retrieving the manifest file with the content management unit from the bulk data extraction unit in response to the search request; searching and parsing the manifest file with the content management unit to identify and retrieve the plurality of data files corresponding to the job ID information; and transferring the plurality of data files associated with the job ID information with the content management unit to the data extraction unit.

The data preprocessing unit can be configured for profiling and cleaning the extracted bulk data and generating cleaned bulk data, converting and transforming the cleaned bulk data into a format suitable for loading into a target system and for generating transformed data, and reconciling the extracted bulk data with the transformed data loaded into the target system.

BRIEF DESCRIPTION OF THE DRAWINGS

These and other features and advantages of the present invention will be more fully understood by reference to the following detailed description in conjunction with the attached drawings in which like reference numerals refer to like elements throughout the different views. The drawings illustrate principals of the invention and, although not to scale, show relative dimensions.

DETAILED DESCRIPTION

Figure 1:
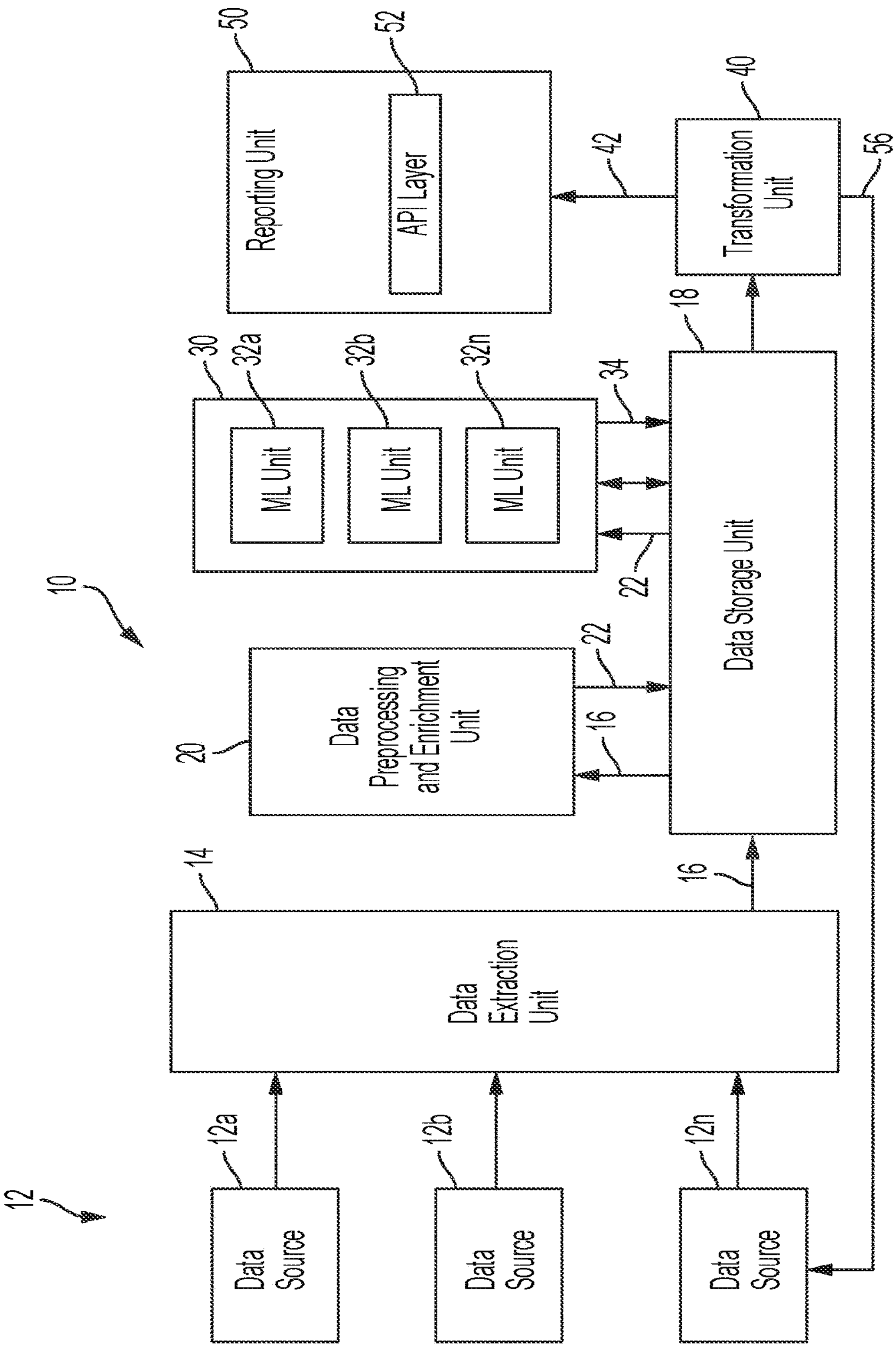
FIG. 1 is a schematic block diagram illustration of a data aggregation and normalization system according to the teachings of the present invention.

The present invention is directed to a data aggregation and normalization system for aggregating data from disparate data sources, processing the data to clean the data and to normalize or standardize the data using one or more data models, and then applying one or more discrete machine learning techniques to the normalized data to provide meaningful data insights and predictions. The normalized data can also be processed by one or more reporting modules to provide one or more customized reports to an end user. The present invention is also directed to an automated and simplified process for communicating between the data sources and the data extraction unit.

As used herein the term "financial data" can include any data that is associated with or contains financial or financial related information. The financial information can include structured and unstructured data, such as information that is presented free form or in tabular formats, and is related to data associated with financial, monetary, or pecuniary interests. The financial data can oftentimes reside in or be extracted from enterprise resource planning (ERP) systems that are designed to aggregate financial as well as other types of data.

As used herein, the term "non-financial data" is intended to include data that is not financial in nature, and can include, for example, environmental related data, user related data, customer-related data, content related data, product related data, supply chain related data, workflow related data, operations related data, reporting related data, manufacturing related data, human resource related data, internet related data including social media information or other publicly available datasets (e.g., census, public government report data), and the like.

As used herein, the term "enterprise" is intended to include a structure or collection of structures (e.g., buildings), facility, business, company, operation, organization, country, or entity of any size. Further, the term is intended to include an individual or group of individuals, or a device of any type.

As used herein, the term "financial unit, "financial subsystem," "financial system" or "financial infrastructure" is intended to include any unit implemented in hardware, software or a combination thereof that applies financial rules and models to data of any type, including financial data and environmental data, so as generate one or more financial reports. The financial rules and modeling can include applying known and/or custom business concepts, accounting concepts, tax concepts, audit concepts, consulting concepts or advisory concepts.

As used herein, the term "financial reports" is intended to include any statement or report that exists in any suitable format (e.g., printed or in digital file format) that sets forth or includes financial data, including, for example, tax returns, income statements, cash flow statements, balance sheets, 10-K statements, 10-Q statements, audit reports, annual reports, loan applications, credit history reports, invoices, and the like.

As used herein, the term "data model" can be an abstract model that represents source data objects, data flow between the data objects, and the interrelationship between the data objects as data elements and organizes the data elements and standardizes how the data elements relate to each other. The data model is in essence a way of storing source data so that the source data can be used in a more efficient manner for further purposes. The data model can include a set of standardized, extensible data schemas that employ a defined set of data entities, data attributes, relationships, and semantic metadata (i.e., traits). The data entity can describe the structural shape and semantic meaning for records of the data. The data entities can thus represent physical objects, locations, interactions, individuals, point-in-time measurements, data types, and the like. The data entity can also describe the meaning and shape of the data through a set of attributes, which can include an atomic or simple attribute type and a more complex, composite attribute type. The data model allows downstream applications to be able to use the data stored therein by providing a normalized, standardized, and shared data language for the applications to use. The data model can have a data structure that includes a data object. According to one embodiment, the data model can include a common data model that allows for the placing of data into a uniform structure that has a defined set of attributes and entities. The common data model can serve to conform, organize, and normalize elements of data and standardize or normalize how the data elements relate to one another and to the properties of real-world entities.

As used herein, the term "data object" can refer to a location or region of storage that contains a collection of attributes or groups of values that function as an aspect, characteristic, quality, entity, or descriptor of the data object. As such, the object can be a collection of one or more data points that create meaning as a whole. One example of a data object is a data table, but can also refer to data arrays, pointers, records, files, sets, and scalar type of data.

As used herein, the term "attribute" or "data attribute" is intended to mean or refer to the properties of a data object. The attribute can hence refer to a quality or characteristic that defines a person, group, or data objects. The properties can define the type of data entity. The attributes can include a naming attribute, a descriptive attribute, and/or a referential attribute. The naming attribute can name an instance of a data object. The descriptive attribute can be used to describe the characteristics or features or the relationship with the data object. The referential attribute can be used to formalize binary and associative relationships and in making reference to another instance of the attribute or data object stored at another location (e.g., in another table).

The term "application" or "software application" or "program" as used herein is intended to include or designate any type of procedural software application and associated software code which can be called or can call other such procedural calls or that can communicate with a user interface or access a data store. The software application can also include called functions, procedures, and/or methods.

The term "graphical user interface" or "user interface" as used herein refers to any software application or program, which is used to present data to an operator or end user via any selected hardware device, including a display screen, or which is used to acquire data from an operator or end user for display on the display screen. The interface can be a series or system of interactive visual components that can be executed by suitable software. The user interface can hence include screens, windows, frames, panes, forms, reports, pages, buttons, icons, objects, menus, tab elements, and other types of graphical elements that convey or display information, execute commands, and represent actions that can be taken by the user. The objects can remain static or can change or vary when the user interacts with them.

FIG. 1 is directed to a data aggregation and normalization system for collecting, collating or aggregating data, such as for example financial and non-financial data, from a variety of different data sources, and then cleaning and enriching the data for subsequent use in a variety of different ways. As shown, the data aggregation and normalization system 10 can include a plurality of data sources 12, and specifically data sources 12*a*-12*n* that are sources of data to be processed by the system 10 of the present invention. According to one example, the data sources 12 can include data from data records generated and stored in a number of different systems that are managed by different types of software applications, including for example software applications from Oracle, Salesforce, and the like. The data acquired by the data sources 12*a*-12*n* can be conveyed through any suitable data connection, such as via a network, to a data extraction unit 14. The illustrated data extraction unit 14 can extract, transform and load (ETL) the extracted data 16 into a data storage unit 18. Specifically, the data extraction unit 14 is configured to copy the data from the data sources 12, transform the data by converting the file or format structure of the source data into another usable form or suitable format, and then load the data in the data storage unit 18. The data extraction unit 14 thus serves as one or more extract, transform and load (ETL) data pipelines between the data sources 12 and the data storage unit 18. Examples of a suitable ETL software application or system that can be employed to extract and load the data from the data sources 12 includes the ETL software platform from Informatica, USA. The data pipeline can be a series of processes and tools used to move, transform, and store data from various sources to a selected destination. The data storage unit 16 can be configured to store the extracted data 16 in any suitable form or format. The data storage unit 18 can be in essence a data lake or a data warehouse. As such, the data storage unit 18 can be configured to store the extracted data in a raw data format, usually as object blobs or files. The data storage unit 18 can also be configured to store processed data in addition to the raw data. The data storage unit 18 can be constructed as a single data store for storing raw and processed data that can be subsequently used for tasks such as reporting, visualization, advanced analytics, machine learning, and the like. The data storage unit 18 can employ, according to one practice, multiple different data buckets that provides a place to store extracted data (e.g., raw data), a place to store cleaned data, provides a workspace for AI/ML modeling processing and a storage area for machine language models, prediction units, and data associated therewith or generated thereby (e.g., trusted data). The data storage unit 18 can include structured data from relational databases (e.g., rows and columns), semi-structured data (e.g., CSV, logs, XML, JSON), unstructured data (e.g., emails, documents, PDFs), and binary data (e.g., images, audio, video). The data storage unit 18 can be implemented in hardware and software on premises (i.e., within the data centers of an enterprise), distributed between multiple different locations or premises, or can be hosted in the cloud using known cloud hosting services from vendors such as Amazon, Microsoft, Amazon, Google, and the like.

Figure 2:
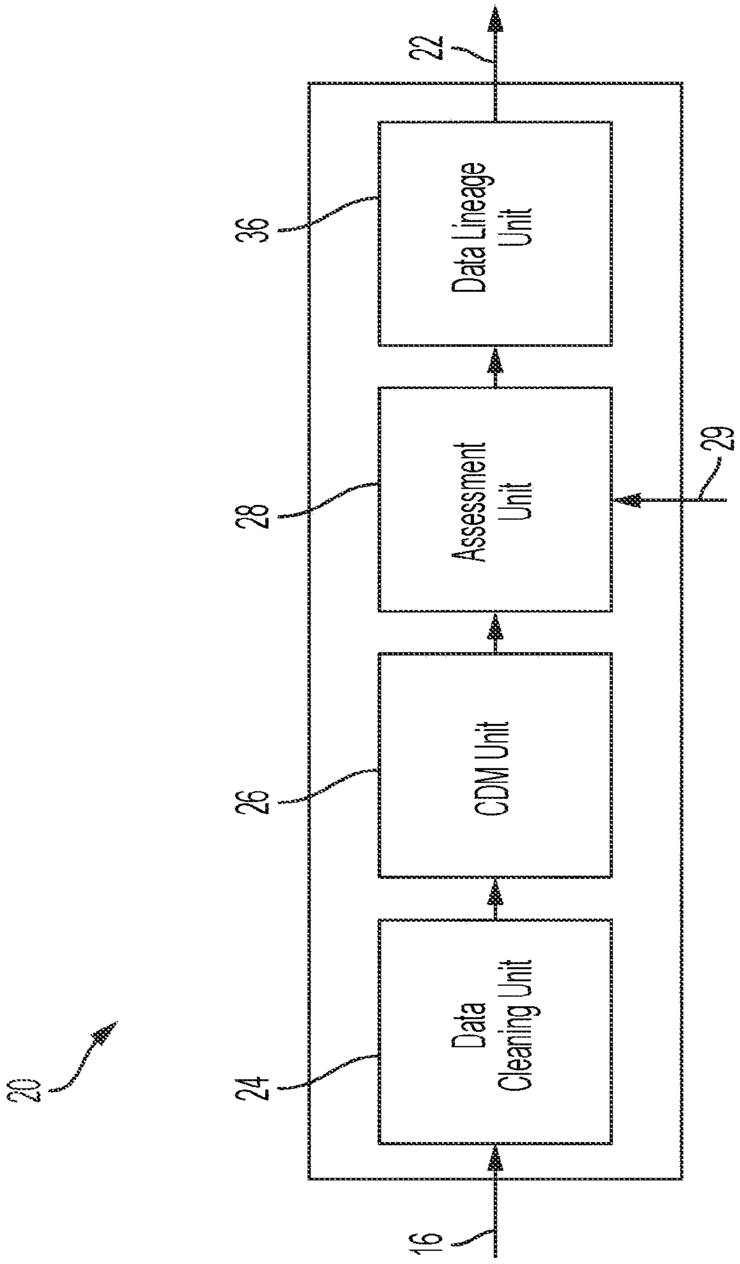
FIG. 2 is a schematic block diagram illustrating the processing components of the data preprocessing and enrichment unit of the data aggregation and normalization system of FIG. 1 according to the teachings of the present invention.

The illustrated data storage unit 18 can communicate with a data preprocessing and enrichment unit 20 for preprocessing and enriching the data for subsequent use by the data aggregation and normalization system 10. As used herein, the term "enrich," "enriching," or "enriched" is intended to include the ability to ingest and integrate data, and then apply logic and structure to the data so as to curate, correct and/or clean the data. Specifically, the data preprocessing and enrichment unit 20 can be configured to pull the extracted data stored in the data storage unit 18 and then perform a series of preprocessing and enrichment operations on the data. As shown for example in FIG. 2, the data preprocessing and enrichment unit 20 can include a data cleaning unit 24 for initially cleaning selected portions of the extracted data stored in the data storage unit 20. As used herein, the terms "data cleaning," "cleaning," and "clean" include the process of detecting and correcting or removing corrupt, inaccurate, or duplicate records from data, such as for example from a record set, table, or database by identifying incomplete, incorrect, inaccurate or irrelevant parts of the data and then replacing, modifying, or deleting the raw, dirty or coarse data. Once the data is cleaned by the data preprocessing and enrichment unit 20, the cleaned data 22 is consistent with other similar data or data sets in the system 10. The inconsistencies detected or removed by the data cleaning unit 24 may have been originally caused by user entry errors, by corruption in transmission or storage, or by different data dictionary definitions of similar entities located in different data stores.

The cleaned data generated by the data cleaning unit 24 can also be used as data to populate a common data model to provide a comprehensive data framework and common interface for the preprocessed data. For example, the data preprocessing unit 20 can further include a common data module (CDM) generation unit 26 for generating or storing a common data model that incorporates or includes the cleaned data received from the data cleaning unit 24. The common data model can serve to conform, organize, and normalize elements of data and standardize or normalize how the data elements relate to one another and to the properties of real-world entities. As is known, data models can include a set of standardized, extensible data schemas that employ a defined set of data entities, data attributes, relationships, and semantic metadata (i.e., traits). The data entity can describe the structural shape and semantic meaning for records of the data. The entities can thus represent physical objects, locations, interactions, individuals, point-in-time measurements, data types, and the like. The entity can also describe the meaning and shape of the data through a set of attributes, which can include an atomic or simple attribute type and a more complex, composite attribute type. The common data model allows downstream applications to be able to use the data stored therein by providing a common, normalized, standardized, and shared data language for the applications to use. The common data model of the present invention can utilize the entities in the Microsoft common data model, and can further include entities such as order lines and suppliers and ledger code combinations. Further, the entities in the Microsoft common data model can be further enhanced to include additional attributes, such as the Account, Product, Company, Invoice, order, Order product, Customer Journey, Lead, Contact, Event, User, Case, Task, Contract, ledger, Journal Header and Line, and Sales Invoice entities.

The data preprocessing and enrichment unit 20 can also employ an assessment unit 28 for assessing the data quality of the cleaned data in the common data model by determining or identifying the data that is anomalous. This can be performed by analyzing historical data and then detecting discrepancies or can employ if desired data from third party data sources 29 that can be employed to detect anomalies in the cleaned data. The historical data can be employed to construct a series of correlated rules and then using the number of rules flagged, or lack of rules flagged, to determine anomalous, error containing, or net-new data types (e.g., a new kind of financial report). As used herein, the term "anomalies" or anomaly" is intended to mean inconsistencies, redundancies, or errors in the cleaned data. The anomalies can be naturally occurring and can result in data that does not match the real-world the data source or database purports to represent. The anomalies can include for example update anomalies, insertion anomalies, deletion anomalies, and the like. Further, as used herein, the term "quality" or "data quality" is intended to mean data that is fit for its intended use in operations, decision making, planning, and the like, and correctly represents the real-world construct to which the data refers.

Figure 3:
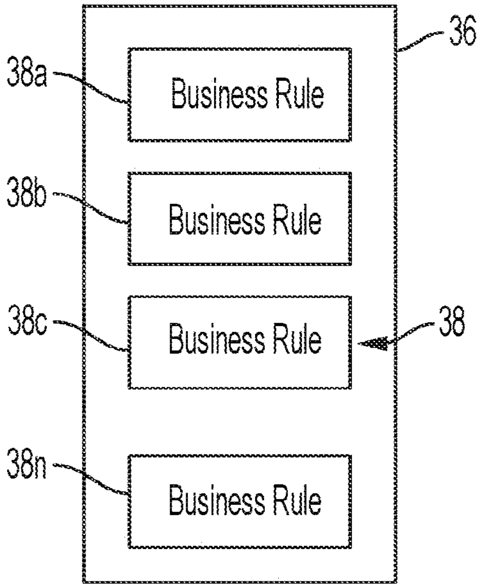
FIG. 3 is a schematic block diagram illustrating the processing components of the data lineage unit of the data preprocessing and enrichment unit of FIG. 2 according to the teachings of the present invention.

The data preprocessing and enrichment unit 20 can also employ a data lineage unit 36 for determining the lineage of selected cleaned data. The illustrated data lineage unit 36 is shown for example in FIGS. 2 and 3. The data lineage unit 36 can determine the source of the data and the lineage or path that the data follows or flows when processed by the data aggregation and normalization system 10. The data lineage unit 36 can be configured to generate a data lineage map or graph or the like to represent or illustrate the flow of data in the system. The data lineage unit 36 can also be configured to employ one or more business rules 38, illustrated as business rules 38*a*-38*n*, for applying selected different business rules to the cleaned data. The term "business rule" as used herein is intended to mean a particular predefined manner or way in which a software application performs, processes or treats data, and which has a business connotation. While business rules are generally conceptual in nature, in a software application they are usually implemented by some fragments or snippets of source code, which enforce the validations or execute the associated calculations. According to one practice, the data can be employed by any selected combination of business rules to process the data in a predefined manner and according to a predefined technique. Business rules modify the raw data to prepare the data for later applications by both updating exiting data and calculating new data based on the predefined business rules. The cleaned and enriched data can then be stored in the data storage unit 18.

The illustrated data aggregation and normalization system 10 can also employ a machine language module 30 that employs a set of predefined machine learning units 32*a*-32*n* for applying one or more selected artificial intelligence and machine learning (AI/ML) models or techniques to selected portions of the cleaned data 22. The machine language module 30 can also employ one or more separate prediction units for generating predictions and/or insights from the cleaned and enriched data. The machine learning techniques can be custom or commonly available artificial intelligence and machine learning methodologies (e.g., computer science algorithms) that have been proven to work with large volumes of data and are able to capture and identify intricate or detailed patterns in the data. The present invention can optionally allow the users to preselect the machine learning methodology applied to the cleaned data prior to application of the data. The machine learning techniques employed by the machine learning units 32*a*-32*n* can include, for example, a supervised learning technique (e.g., regression or classified techniques), an unsupervised learning technique (e.g., mining techniques, clustering techniques, and recommendation system techniques), a semi-supervised technique, a self-learning technique, or a reinforcement learning technique. Examples of suitable machine language techniques include Random Forest, neural network, clustering, XGBoost, bootstrap XGBoost, Deep learning Neural Nets, Decision Trees, regression Trees, and the like. The machine learning algorithms may also extend from the use of a single algorithm to the use of a combination of algorithms (e.g., ensemble methodology) and may use some of the existing methods of boosting the algorithmic learning, bagging of results to enhance learning, incorporate stochastic and deterministic approaches, and the like, to ensure that the machine learning is comprehensive and complete. The machine learning units 32*a*-32*n* can generate insights and predictions that can be stored in the data storage unit 18. According to one practice, AI/ML models or techniques can be packaged within containerized API applications, which can be deployed at scale, for example, within a Kubernetes-based environment. The machine language data 34 generated by the machine language module 30 can be stored in the data storage unit 18 as trusted data since it has a relatively high fidelity.

The data aggregation and normalization system 10 can also employ a transformation unit 40 for transforming the trusted data (e.g., the machine language data) into transformed data 42 having a format suitable for use by the reporting unit 50 via an application programming interface (API) layer 52. For example, when the trained machine language models are stored in the data storage unit 18, the transformation unit 40 can convert and update the configurations of the trained models for use by the reporting unit 50. Alternatively, if the machine language data includes results from one or more of the machine language units or includes a series of predictions or insights (e.g., in Json or tabular parquet format), the transformation unit 40 can transform or update the relevant tables in the API database layer 52. This update result is then reflected in microservices or applications that pull data from the table.

Further, the illustrated system 10 an employ a data feedback loop 56 for reintegrating or reintroducing to one or more of the data sources the transformed data for subsequent processing by the data preprocessing and enrichment unit 20. Furthermore, the AI/ML model results, predictions and insights can be fed back into the relevant data pipelines, such as for example into the data sources 12*a*-12*n*. This technique allows enriched data and AI/ML model results to be leveraged by additional models and to be integrated within data source systems.

The reporting unit 50 can include an application programming interface for enabling selected reporting software applications to interface with the transformed data. The reporting software applications can include any selected commercially available or custom reporting applications that generate selected user interfaces for reporting and displaying selected information. The reporting unit can also include a user interface generator 60 for generating one or more user interfaces that can be displayed on a display device. The user interfaces can be generated to present reports to the system user.

Figure 4:
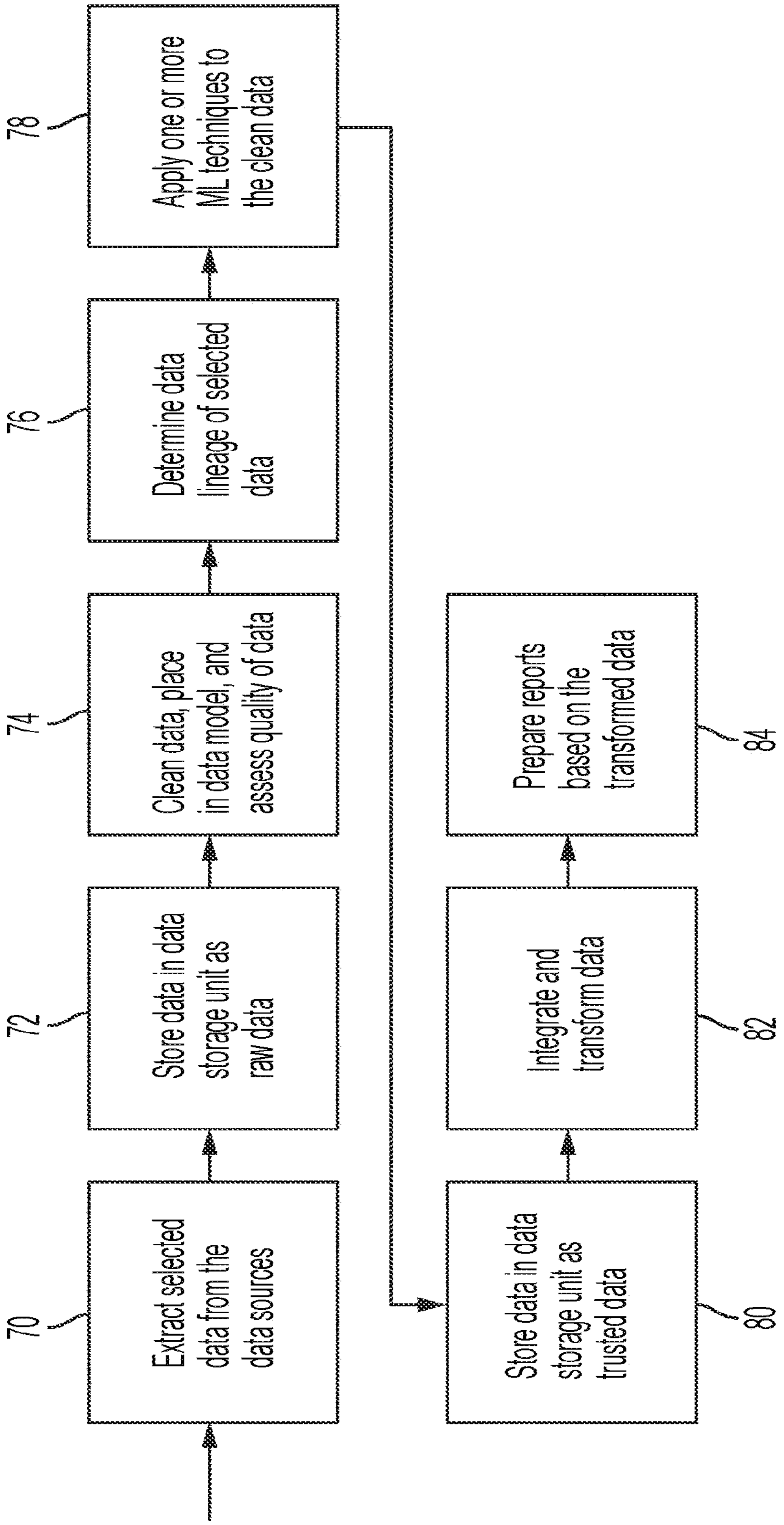
FIG. 4 is a schematic flow chart diagram illustrating the method of forming normalized data by the data aggregation and normalization system of FIG. 1 according to the teachings of the present invention.

In operation, as shown for example in FIG. 4, the data extraction unit 14 pulls or extracts selected data from the data sources 12*a*-12*n*, step 70. For example, the data aggregation and normalization system 10 can employ a Microsoft Azure Data Factory software platform that employs extract, transform, and load (ETL) software to form data driven workflows (e.g., pipelines) that helps extract and integrate selected data records from the data sources, transform the data using for example compute services such as HDInsight Hadoop, Spark, Data Lake Analytics, or Machine Learning, and then loading or publishing the data. Alternatively, the system 10 can employ other types of ETL software or platforms, such as for example the software platform from Informatica, USA. The extracted data 16, which is in essence raw data, can be stored in the data storage unit 18, step 72. The data storage unit 18 can include multiple storage units that can be located in a single location or can be dispersed throughout a network. Further, the data storage unit 18 can also include remote storage resources that are cloud hosted by one or more cloud storage providers, such as for example Microsoft, Amazon Web Services, Google, and the like. According to one practice, the data storage unit 18 can employ binary large object (BLOB) storage that is in essence binary data stored as a single entity. In Microsoft Azure, the blob storage can employ multiple containers or buckets that store blob type data. In the current embodiment, the data storage unit 18, if implementing blob type storage, can store the raw data in a raw blob data container or bucket.

The data aggregation and normalization system 10 of the present invention can employ a data preprocessing and enrichment unit 20 for preprocessing the extracted raw data to form cleaned data 22, step 74. The cleaned data 22 can also be stored in the data storage unit 18. The data preprocessing and enrichment unit 20 can be constructed in any selected manner to form the cleaned data 22. According to one embodiment, the data preprocessing and enrichment unit 20 can employ a data cleaning unit 24 for cleaning the extracted data. The data preprocessing and enrichment unit 20 can also employ a common data model (CDM) unit 26 for mapping or placing the data in a common data model. The common data model can have a set of defined attributes and entities for organizing the data in a standardized data format. The data in the common data model can then be processed by an assessment unit 28 for assessing the quality of the data. As used herein, "data quality" or "quality of data" is intended to mean a measure of the condition of data based on a series of factors, which can include for example accuracy, completeness, reliability, consistency, timeliness, and/or accessibility of the data. The data from the assessment unit 28 can then be processed by a data lineage unit 36 for determining and then displaying a data lineage map or graph of selected data, step 76. The data lineage unit 36 can also apply or overlay one or more business rules to the data. The cleaned data 22 can then be stored in the data storage unit 14 in, for example, a cleaned blob data bucket.

The cleaned data 22 can then be processed or consumed by a machine language module 30 that employs one or more machine language units 32*a*-32*n*. The machine language units can process the cleaned data using one or more pre-stored, predefined and trained machine language techniques for generating insights, predictions, machine language models, and the like, so as to form machine language or trusted data 34, step 78. Specifically, selected ones of the entities representative of selected portions of the cleaned data can be processed or consumed by selected ones of the machine language units. As the machine language module 30 processes the cleaned data, the module 30 can store the intermediate processing results in the data storage unit 18. The machine language data 34, when generated, can then be stored in the storage unit 18 as machine language or trusted data 34, step 80. According to one practice, the machine language data 34 and the intermediate results can be stored in separate and distinct blob data buckets. According to one practice, the data storage unit can function as a data lake with multiple different data buckets providing a place to land or store the extracted data, the cleaned data, the intermediate results, and the trusted or machine language data.

The illustrated data aggregation and normalization system can also employ a transformation unit for transforming the machine language data into a format that is suitable for use by one or more applications employed by the reporting unit 50, step 82. The transformation unit can transform the data using suitable techniques, such as for example by using a data mapping technique. Data mapping is the process of matching data fields or elements from a data source, such as the machine language data, to related data fields at a destination, such as one or more applications in the reporting unit 50. The data mapping technique allows the system to establish relationships between data models that are in different sources or systems. According to another practice, the transformation unit 40 can implement one or more data pathways or pipelines for transforming and exchanging data between the data storage unit 18 and the reporting unit 50. According to one embodiment, the data pathways can include a pathway for conveying data about the trained ML models in the form of serialized binary-files to as to update configurations of one or more applications in the reporting unit 50 that employ the ML model data. Alternatively, if the machine language data includes insights and predictions, which can be represented as data objects in Java Script Object Notation (JSON) or in tabular parquet format, then the transformation unit 40 can update the relevant tables in one or more applications in the reporting unit 50. Further, the transformation unit 50 can update or feed back into the relevant data sources the machine language data as application enhancements employing another data pathway or loop 56.

The transformed data 42 can then be conveyed to one or more reporting or visual representation software applications stored in or which form part of the reporting unit 50 via the API layer 52. The API layer 52 allows the transformed data and other system software applications to communicate with the applications of the reporting unit, as well as with external third party applications. The reporting unit 50 can employ one or more reporting applications that can be configured for generating one or more reports, including financial reports, based on the transformed data, step 86. Further, a system user can interface with the reporting unit 50 to construct a selected report.

The data aggregation and normalization system employs the illustrated units and modules to form a complete, efficient, and robust data normalization unit for automatically extracting, cleaning, and normalizing data for subsequent use by a reporting unit. The selected combination of units, including the data extraction unit and the data preprocessing and enrichment unit, provide for specific synergies and efficiencies when processing and enriching the data. For example, the system cleans the extracted data and then normalizes the data by loading or storing in a common data model. The data once in the model can be examined or processed for quality by the assessment unit to ensure that the data is in proper form. The data lineage unit can then determine a lineage or flow path of selected portions of the cleaned data through the system 10. This approach automates selected tasks when developing data pipelines and leverages highly scalable and performant technologies which meet the demands of large datasets.

Figure 5:
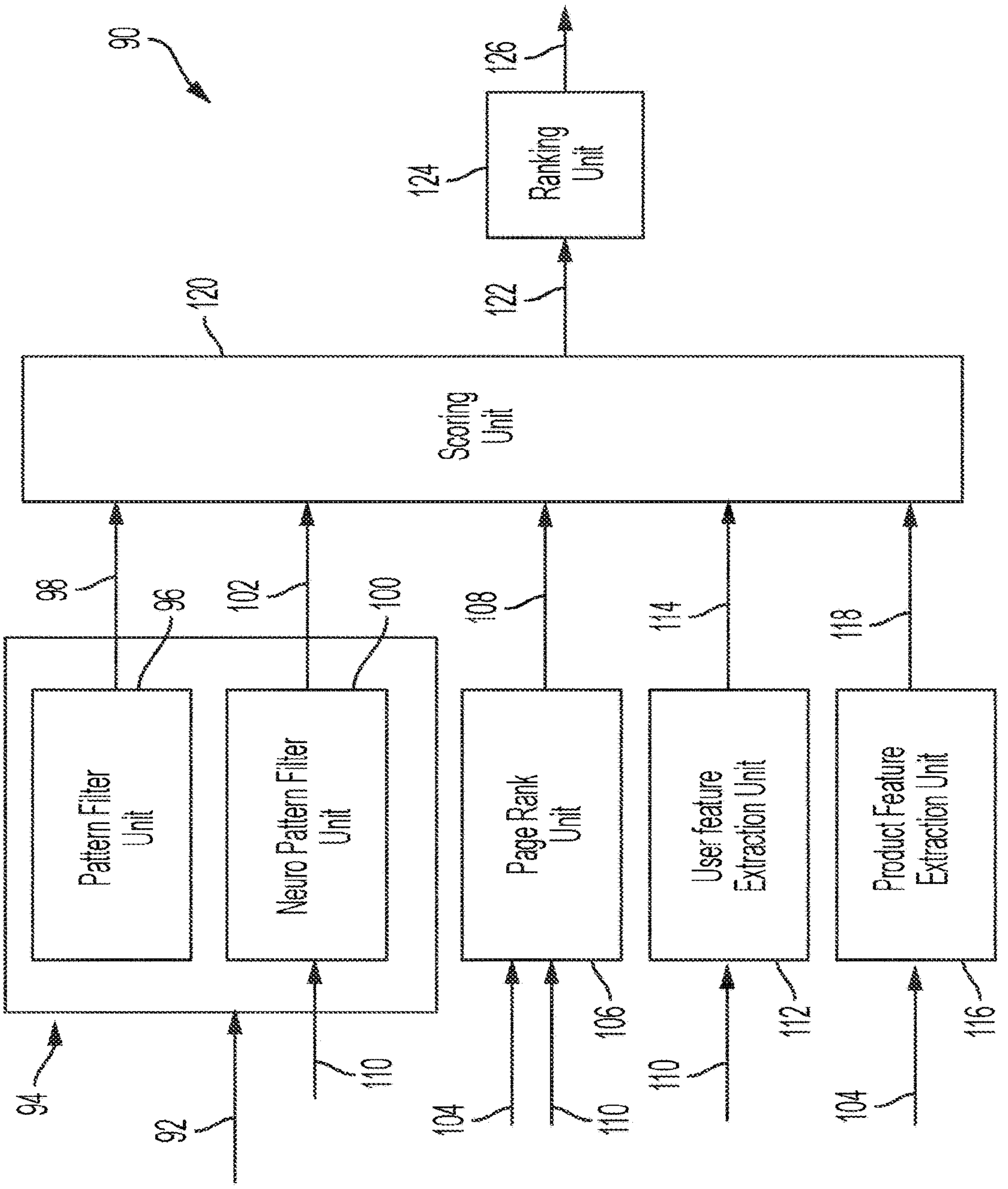
FIG. 5 is a schematic block diagram showing the elements of a prediction unit that forms part of the data aggregation and normalization system according to the teachings of the present invention.

The machine language module 30 of the data aggregation and normalization system 10 of the present invention can also optionally include a prediction unit for generating insights and predictions from the cleaned data according to the teachings of the present invention. FIG. 5 illustrates one embodiment of a prediction unit 90 for predicting user or customer interest in a product according to the teachings of the present invention. The data sources 12 can include non-financial data that is processed by the data preprocessing and enrichment unit 20 so as to clean and normalize the data. The non-financial data can include, for example, transaction related data, product related data, and user related data. The prediction unit 90 processes the input data and generates product recommendations and predictions based thereon. As used herein, the term “transaction related data” or “transaction data” is intended to include any selected type of data related or corresponding to the buying or selling of goods or services or related to business conducted between one or more enterprises. The transaction data can include, for example, user data, product data, geographic related information, date and time related data, purchase data including current and historical, and the like. As used herein, the term “product related data” or “product data” is intended to include any type of data identifying or related or corresponding to a product, such as an item, object or system available for use. The product data can include product identification information including product name, product type, quantity, product number, product description, unit of measure, cost and price, specifications, data sheets, image of product, and the like. Further, as used herein, the term “user related data” or “user data” is intended to include any types of data related or corresponding to a user or a collection of users, including, for example, content feature data, profile data, identification data such as name, address, city, state and the like, demographic data including age, gender, race, location, occupation, education, employment, marital status, income level, height, weight, behavior-derived type data including for example Life-Time Value (LTV) data, login persona data (e.g., daily, weekly, and monthly user type data), and the like.

The cleaned data 22 generated by the data preprocessing and enrichment unit 20 can include transaction data 92 that is processed by a filter unit 94 for filtering the transaction data to find patterns in the data and to generate an interest score having an interest score value associated therewith and indicative of a user’s interest in a particular product or service. The filter unit 94 establishes relationships between products and users (e.g., customers) and then generates recommendations based on the transaction data. According to one embodiment, the filter unit 94 can include a pattern filter unit 96 for identifying one or more patterns in the transaction data. For example, the pattern filter unit 96 first identifies a set of users similar to a selected user having similar product preferences and then identifies or determines patterns of similarities between products that appear to be of interest between the users. The patterns can be related to, for example, the purchase of products by users that are similar to a selected user. The pattern filter unit 96 can generate a map or matrix of users to products and can then determine similar products that may be of interest to the selected user based on an affinity towards those products by other users that have interacted with those products. Based on this pattern of information, the pattern filter unit 96 can determine the likelihood that the selected user may purchase a selected product based on the selection preferences and interests of the similar users. Based on this information, the pattern filter unit 96 can recommend products to the selected user that may be of interest. According to one practice, the pattern filter unit can employ a collaborative filtering technique. In this regard, the pattern filter unit 96 can automatically make predictions (i.e., filtering) about the interests of the selected user by collecting preferences or taste information from many users having similar interests. The pattern filter unit 96 can then generate a first product interest score 98 having a selected value associated therewith that is indicative of an interest level in a selected product by the selected user. The first product interest score value can be any selected numerical designation and is preferably a value having a range between 0 and 1.

The illustrated filter unit 94 can also include a neuro pattern filter unit 100 for also processing and filtering the transaction data 92 as well as user data 100. The user data 100 can include content feature data that includes, for example, profile and demographic data about the user. The neuro pattern filter unit 100 can process and filter the transaction data 92 and the user data 100 by representing the user-item relationship as a vector of latent features which are projected into a shared feature space using a non-linear representation. In this feature space, the user-item interactions can be modeled using the inner product of user-item latent vectors. Further, the neuro pattern filter unit 100 can model the user-item feature interaction through a neural network architecture so as to learn user-item interactions. As such, and similar to the pattern filter unit 96, the neuro pattern filter unit 100 can filter out items that a user may like based on the reactions of similar users and can determine or find patterns in the data. Specifically, the neuro pattern filter unit 100 can initially identify a set of users similar to a selected user and then identify patterns of similarities between products that appear to be of interest between the users. The patterns can also be related to, for example, the purchase of products by users that are similar to a selected user. According to one practice, the neuro pattern filter unit 100 can employ a neuro collaborative filtering technique. In this regard, the neuro pattern filter unit 100 can automatically make predictions (i.e., filtering) about the interests of the selected user by collecting preferences or taste information from many users having similar interests. That is, the neuro pattern filter unit can identify from the transactional data and the user data a set of users having similar product preferences to the selected user. The neuro pattern filter unit 100 can then generate a second product interest score 102 having a selected value associated therewith that is indicative of a user interest level in a particular product. The second product interest score value can be any selected numerical designation, and is preferably a value having a range between 0 and 1.

The illustrated prediction unit 90 can also employ a page rank unit 106 for processing product data 104 and the user data 110 and then determining based thereon a community interest score in one or more products. As used herein, the term “community interest” is intended to mean an interest in an item, object or service that is common between multiple different users. Further, the term "community interest score" is intended to mean a value associated with or quantifying the community interest in the item, product, or service. The page rank unit 106 operates by counting or determining the number and quality of web links directed to one or more web pages hosting or listing a selected product to determine an estimate of the importance of the product. The more links that are directed to the selected product, then the higher the importance value of the product. Thus, as more users (e.g., community) link to the product, the higher the importance of the product, and hence the higher an associated community interest score associated with the product. The page rank unit 106 thus generates a community interest score 108 associated with the product. The community interest score 108 can have a selected value associated therewith having a range between 0 and 1.

The prediction unit 90 can further include a user feature extraction unit 112 for processing user data 110, determining and identifying selected relevant or important user features or elements, and then generating a plurality of user feature scores or values 114 that can be weighted relative to each other. As used herein, the term "user feature" is intended to include specific relevant traits or attributes of a user or a set of users that can function as variables when employed in a machine learning technique. The user features can include, for example, demographic features such as age, gender, race, location, occupation, education, employment, marital status, income level, height, weight, and the like, as well as profile data features and identification features such as name, address, city, state and the like. The user feature extraction unit 112 can identify the important or primary relevant features in the user data 110 by applying a selection reduction technique, such as for example a principal component analysis technique, to reduce the dimensionality of the user data by identifying the primary features or principal components in a dataset defined by the user data. As used herein, the term "primary features" is intended to mean variables that are highly correlated with the identified target variable and typically do not correlate with each other. The user feature extraction unit 112 can then determine and identify the important or primary user features and can then apply a weighting technique to the user features so as to weight the user features relative to each other. For example, the user features that are more important or applicable to a selected user can be assigned a higher weighted value. The user feature extraction unit 112 then generates a set of user features having associated scores or values 114 that are weighted relative to each other.

The prediction unit 90 can also include a product feature extraction unit 116 for processing the product data 104, determining and identifying selected important or primary product features or elements, and then generating a plurality of product feature scores or values 118 that can be weighted relative to each other. As used herein, the term "product feature" is intended to include specific relevant traits or attributes of a product that deliver value to a user, and which can differentiate the product in the marketplace and provides a benefit or set of benefits to the user. The product features can function as variables when employed in a machine learning technique. The product features can include, for example, product type, product name, quantity, size, color, product number, product description, unit of measure, cost and price, product image, and the like. The product feature extraction unit 116 can identify the important or primary relevant features in the product data 104 by applying a selection reduction technique, such as for example a principal component analysis technique, to reduce the dimensionality of the product data by identifying the primary features or principal components in a dataset defined by the product data. The product feature extraction unit 116 can then determine and identify the important or primary product features and can then apply a weighting technique to the product features so as to weight the features relative to each other. For example, the product features that are more important or applicable to a selected user can be assigned a higher weighted value. The product feature extraction unit 116 then generates a set of product features having associated scores or values 118 that are weighted relative to each other.

The first product interest score 98 and associated value, the second product interest score 102 and associated value, the community interest score 108 and associated value, the user feature score 114 and associated value, and the product feature score 118 and associated value can be conveyed or transferred to a scoring unit 120 for processing the scores or values. In particular, the scoring unit can determine a final product interest score 122 based on the scores and values provided as inputs. The final product interest score 122 generated by the scoring unit 120 and any associated value can be an average of the input scores, a median of the input scores, the best or highest input score received by the scoring unit 120, or by some other meaningful numerical combination input scores. The scoring unit 120 can employ a neural network technique for processing and managing the input score values, and preferably can employ a feed forward neural network. The final product interest score 122 can have a value associated therewith between the range of 0 and 1. The final product interest score 122 can be conveyed to a ranking unit 124 for selecting and ranking the final product interest scores associated with a number of different products. The ranking unit can rank the scores in any selected manner or fashion, and preferably ranks the scores from highest to lowest scores. The ranking unit 124 can then generate rank data 126 indicative of the product rankings. The ranking unit 124 also allows for additional business consideration to be incorporated with rankings output from the machine learning unit to prepare a final set of recommendations. For example, the scoring unit 120 can output the top best recommendations for a customer as a series of products. If the scoring unit is preset to provide the top five recommendations, then the product series can include product 1, product 2, product 3, product 4, and product 5. The ranking unit 124, however, may incorporate a business preference to sell more of a selected product (e.g., product 4), and change the product ranking to reflect this business preference as, for example, product 1, product 4, product 2, product 3, product 5. Business considerations may also prioritize related products in a group in the ranking. For example, the scoring unit 120 may output product 1*a*, product 2*a*, product 1*b*, product 3, product 2*b*. But the ranking unit 124 prioritizes related products and changes the ranking to product 1*a*, product 1*b*, product 2*a*, product 2*b*, and product 3. The ranking data thus serves as predictions regarding the products and product features that the user have interest. The rank data forms part of the machine language data that can be stored in the data storage unit 18. This collection of units allows for a flexible approach which can begin to work when a client has a minimal amount of data, and becomes more sophisticated as more data becomes available.

Figure 6:
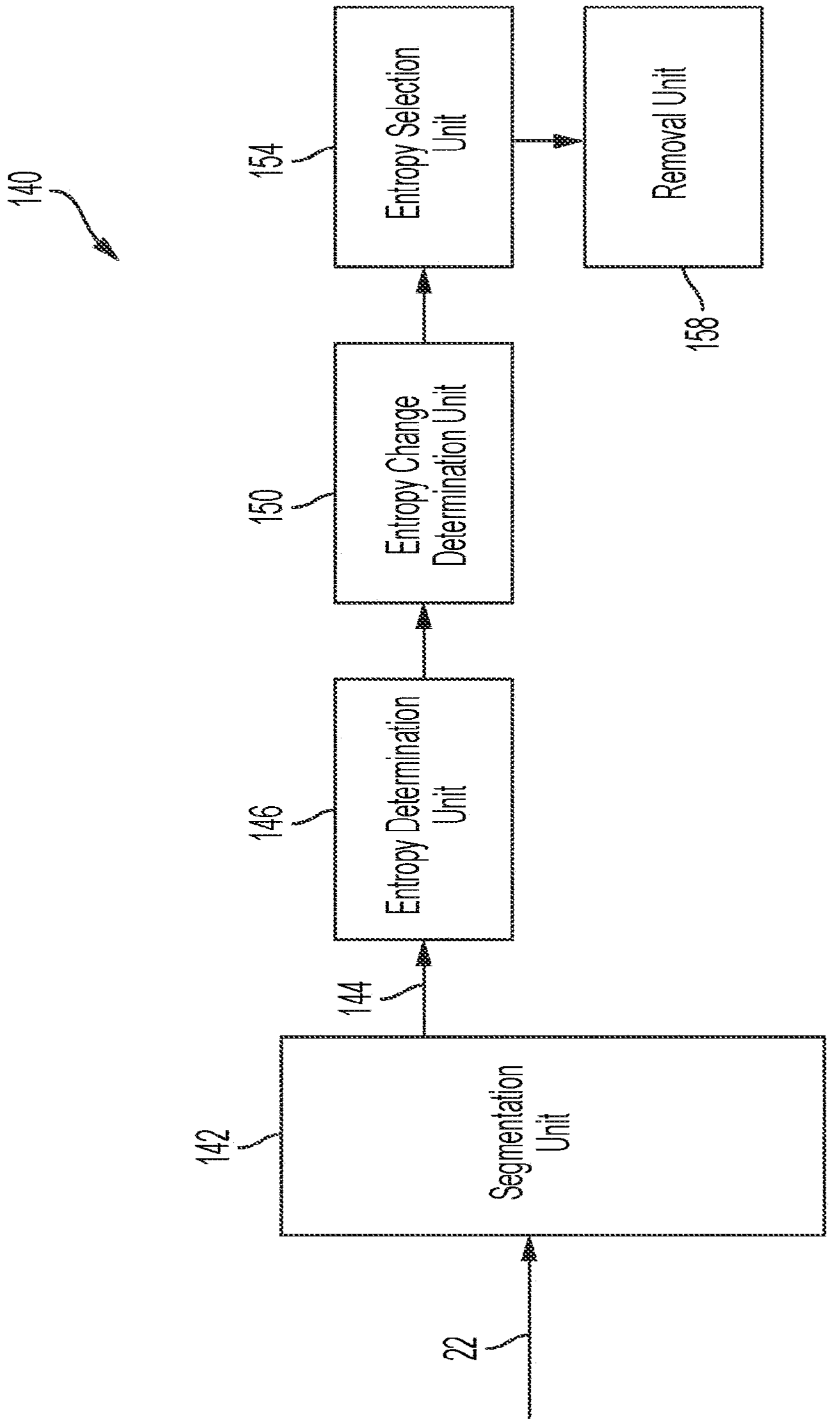
FIG. 6 is a schematic block diagram showing the elements of an anomaly detection unit that forms part of the data aggregation and normalization system according to the teachings of the present invention.
Figure 7:
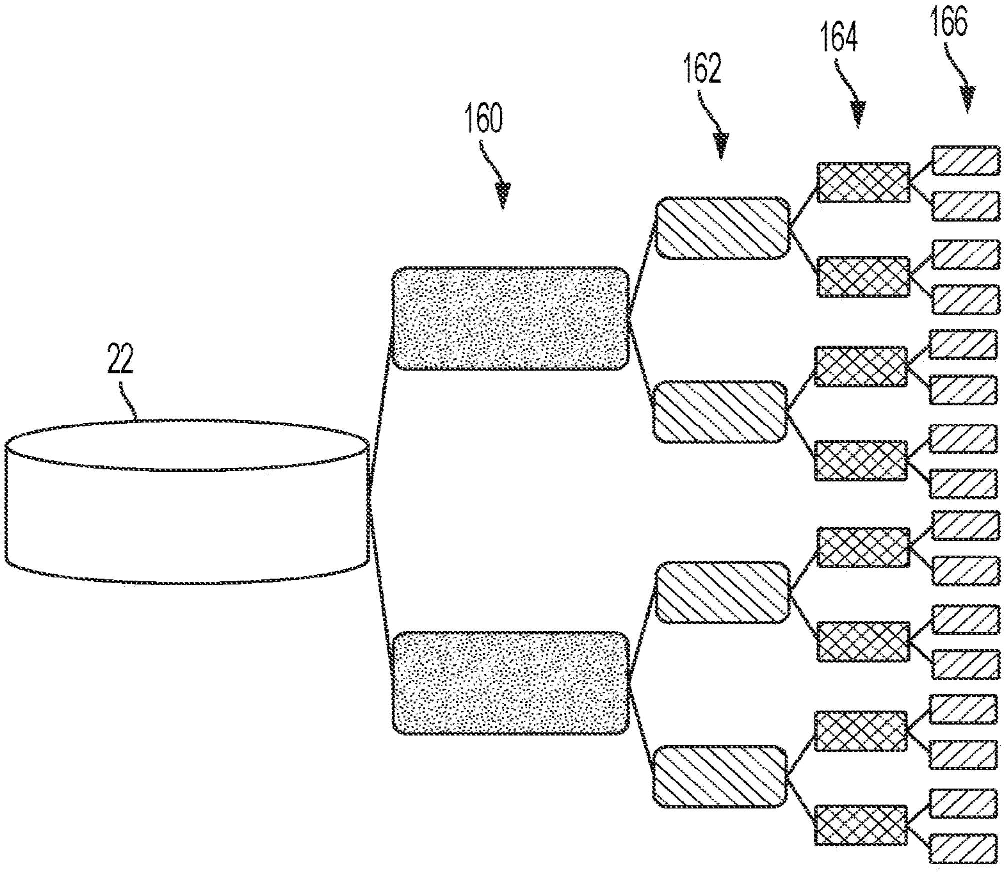
FIG. 7 is a schematic representation of segmented data that is segmented by a segmentation unit that forms part of the anomaly detection unit according to the teachings of the present invention.
Figure 8:
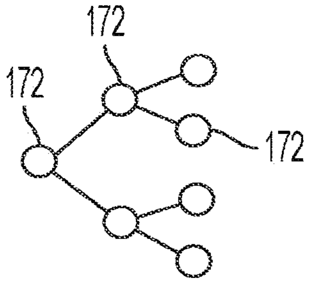
FIG. 8 is a schematic representation of a decision tree that represents segmented data according to the teachings of the present invention.

As illustrated in FIG. 6, the machine language module 30 of the present invention can also include an optional anomaly detection unit 140 for identifying and detecting anomalies in selected portions of the cleaned data 22. As used herein, the term "anomalies" and "anomaly" is intended to mean the detection of data, items, events, or observations that do not conform to and differ significantly from an expected outcome or pattern or from other items in a dataset, locally or globally, that are usually undetectable by a system or by a human subject matter expert. The detection of anomalies can be applicable in a variety of domains, such as, for illustrative purposes only, intrusion detection, financial fraud detection, fault detection, system health monitoring, event detection in sensor networks, defect detection in images using machine vision, system inefficiencies, and the like. The anomaly detection unit 140 can include a segmentation unit 142 for segmenting the cleaned data, presented in the form of a dataset, into a plurality or series of data segments. The segmentation unit 142 can segment or group together the cleaned data into two or more subsets, which can in turn be further segmented as needed. The data can be segmented according to one or more data attributes, date type, use cases, and the like. The data attribute can be any selected data descriptor (e.g., so as to represent categorical variables) that describes other data. The data 22 can be segmented into a series of combinations of the data based on the selected variables and attributes. An illustrative example of the data segmentation process performed by the segmentation unit 142 is shown for example in FIG. 7. The illustrated cleaned data 22 can be segmented for example into macro segments 160, which can be further segmented or divided into multiple additional groups or tiers of segments 162, 164, 166. The data segments can be arranged in any selected pattern or manner, and are preferably arranged in a hierarchical manner. The data segments can also be represented in a decision tree or process flow format 170 as a series of nodes 172, representing the subpopulations, and corresponding edges 174, which represent a logical statement distinguishing the subpopulations, as shown for example in FIG. 8. The data segments are represented as the nodes 172 in the tree 170.

Figure 9A:
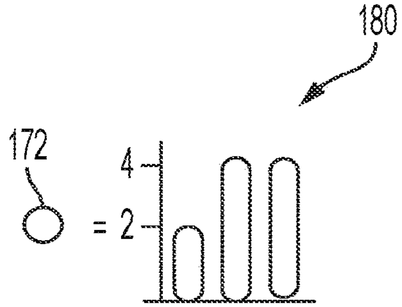
FIG. 9A is a graphical representation of a distribution of sub-population values generated by the anomaly detection unit according to the teachings of the present invention.

The anomaly detection unit 140 also includes an entropy determination unit 146 for determining the entropy of each of the segmented data 144 associated with the data segments 160, 162, 164, and 166. As used herein, "entropy" is intended to mean a measure of the amount of disorder or surprise in a system, data, data segment, and the like. The entropy of the data can be measured and quantified according to known techniques and can be calculated into an entropy value that typically ranges between 0 and 1 or higher, where the higher the number corresponds to a higher amount of disorder in the data or system. The entropy values can be collated to form a distribution of entropy values. For example, as shown in FIG. 9A, each of the data segments or tiers of data segments (e.g., sub-populations) can be represented as a node 172 in the decision tree, and an entropy value can be calculated for the subpopulation distribution 180 indicating its level of surprise or disorder. As such, the entropy value is a statistic of the sub-population. The sub-population distribution can be represented as a graph having the number of members along the Y-axis and distribution bins represented along the X-axis. A relatively flat distribution is indicative of the outcome as being relatively equal and the surprise or amount of disorder is maximized since all possible outcomes are present. Further, in the edge between two sub-population distributions 180, the differences in entropy values between data segments is indicative of a selected amount or degree of disorder or surprise.

Figure 9B:
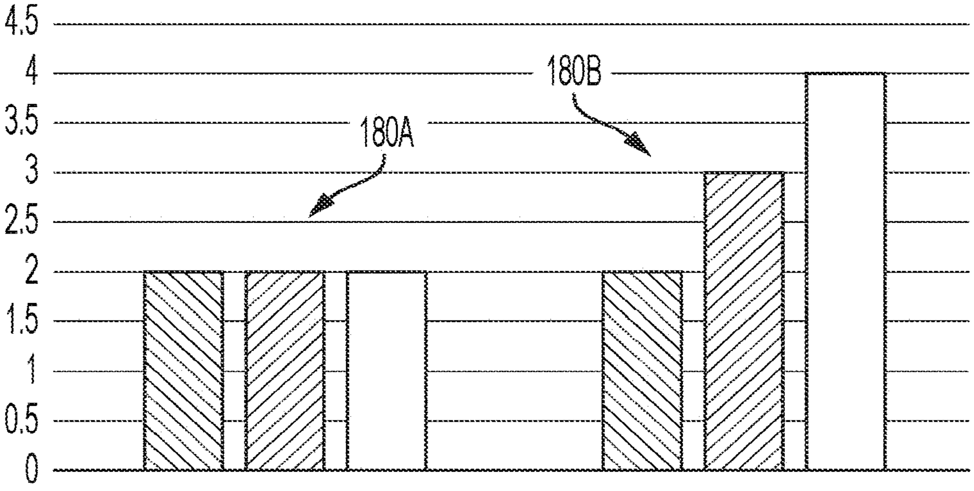
FIG. 9B is a graphical representation of a distribution of entropy change values generated by the anomaly detection unit according to the teachings of the present invention.

The anomaly detection unit 140 can also include an entropy change determination unit 150 for determining a change in entropy of each of the data segments or sub-populations of data segments relative to each. The difference or change in entropy can be represented as an entropy change value that is indicative of or a measure of the change in disorder or surprise between the data segments. The entropy change values can correspond to the edges 174 in the decision tree 170. The change in entropy can be determined or calculated by using a Kullback-Leibler (K-L) divergence technique. The entropy change value is a measure of a difference between two random data segments or sub-populations of data segments. The entropy change values can be organized so as to identify a distribution of entropy change values across the data segments or sub-populations of data segments. According to one practice, the entropy change values can be calculated or determined between respective entropy distributions. For example, as shown in FIG. 9B, the changes in entropy values associated with the constituent portions of a first distribution of data segments or sub-populations 180A is compared with the changes in entropy values associated with the constituent portions of a second distribution of data segments or sub-populations 180B. If the entropy distributions that are compared with each other are the same, then the change in entropy values is zero. In the illustrated example, the second entropy distribution 180B is different from the first entropy distribution, and hence when compared with each other the unit 150 determines that there is a selected measure of entropy change that exists in the system. The entropy change value enables the anomaly detection unit 140 to identify potential anomalies in the data segments.

Figure 9C:
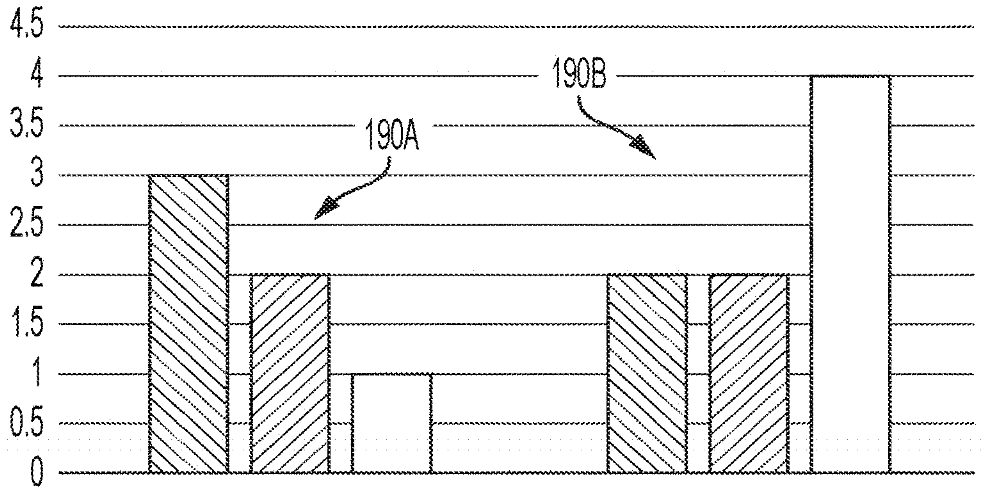
FIG. 9C is a graphical representation of multiple different distributions of entropy change values generated by the anomaly detection unit according to the teachings of the present invention.

The illustrated anomaly detection unit 140 can further include an entropy selection unit 154 for analyzing the distribution of entropy change values generated by the entropy change determination unit 150 and then selecting the entropy change values from among the distributed entropy change values that have the greatest impact on the mean value of the entropy change values. Entropy is a technique that captures various changes in distributions. From a business perspective, only the changes that move the mean up or down are likely to be material from a business perspective. As such, the anomaly detection unit 140 can select instances of an entropy change and also where the change or difference is significant since it moves the distribution in the correct direction. Specifically, the entropy selection unit 154 identifies and selects the distributions of entropy change values that trend in an upward direction and hence add to or increase the overall mean cost. Alternatively, the entropy selection unit 154 can identify and select the entropy change values that trend in a downward direction. From the selected values, the entropy selection unit 154 can identify or select the relevant data segments from a business perspective. For example, as shown for example in FIG. 9C, the illustrated chart shows a first distribution of entropy change values 190A and a second distribution of entropy change values 190B. The first distribution 190A has a declining or negative entropy change value and the second distribution 190B has an increasing or positive entropy change value. As such, the second distribution can be identified and selected by the entropy selection unit 154 since it has a positive or greater impact on the mean entropy values.

Figure 9D:
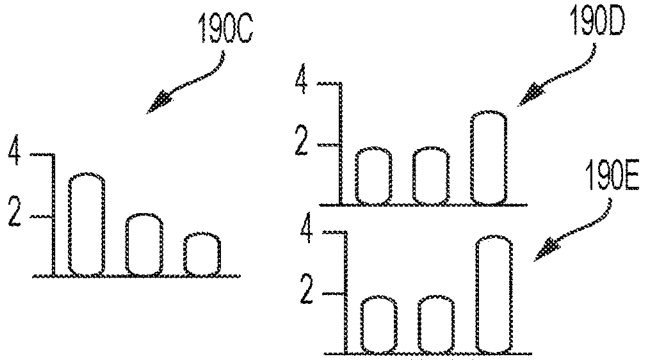
FIG. 9D is a graphical representation of a selection of similar sub-population distributions being clustered together according to the teachings of the present invention.

The anomaly detection unit 140 still further includes a removal unit 158 for identifying and clustering together entropy change values that have similar entropy change value distributions. For example, as shown in FIG. 9D, sample distributions of entropy change values 190C, 190D and 190E are illustrated. The distribution of entropy change values 190C is different than the distributions 190D and 190E. Further, the distributions 190D and 190E are the same. As such, the removal unit 158 can identify the distributions 190D and 190D, and since they are the same, perform a clustering technique and cluster together the distributions 190D and 190E. The similarity of the distributions of the entropy change values can correspond to data segments that have an identical anomaly associated therewith. Oftentimes, the similarity corresponds to a parent-child hierarchical arrangement of data segments that are highly similar and represent the same underlying anomaly. When this occurs, the entropy selection unit 154 can select one of the entropy value distributions as a representative distribution and remove the identical distributions. For example, the removal unit 158 can select either distribution 190D or 190E as a representative distribution and remove the non-selected distribution. The remaining distributions of entropy change values correspond to anomalies that exist in the data segments. The removal unit 158 thus enables the removal of redundant information, such as distributions of entropy change values, so that the system can process the data with fidelity and with a high degree of accuracy. The entropy change values can be forwarded to the reporting unit 50 and then inserted into any suitable visualization software for review by the user.

The anomaly detection unit 140, being a combination of the segmentation unit 142, the entropy detection unit 146, entropy change determination unit 150, entropy selection unit 154, and the removal unit 158, has a specific advantage of being a systematic protocol for identifying unambiguous sub-population anomalies in a dataset in a comprehensive and unbiased way. The segmentation unit 142 can identify all possible subpopulations. The entropy determination and change units utilize a sensitive information statistic to identify a wide variety of differences in sub-populations, which captures a wide range of potential anomalies, and then the entropy selection and removal units refine this range of sub-population differences to identify unambiguous local and global anomalies that are potentially material to the objectives of the business.

Efficiency can be gained through changes to the configuration of the segmentation, entropy selection, and removal units. The segmentation unit 142 can be configured through directed hierarchical searches of sub-populations to follow a particular business objective. Less permissive selection criteria in the entropy selection and removal units can restrict the analysis to more significant or material anomalies. For example, the initial analysis of complex supply chain data, and a broad, unbiased selection of all sub-populations in the data would be desirable to identity anomalies and potential business objectives. A follow-up analysis can then attempt a more specific search by configuring an ordered search hierarchy in the segmentation unit and less-permissive configurations in the entropy selection and removal units. For example, a broad analysis of the supply chain data can determine that some combination of day-of-week shipped and destination US states have anomalous high shipping costs. A follow-up analysis hierarchically segmenting first by day-of-week and then by US states with less-permissive selection thresholds can isolate the underlying cause of the anomalous shipping costs. Systematically identifying underlying cost anomalies allows an organization to adapt its supply chain operations to better service its business goals.

Figure 10:
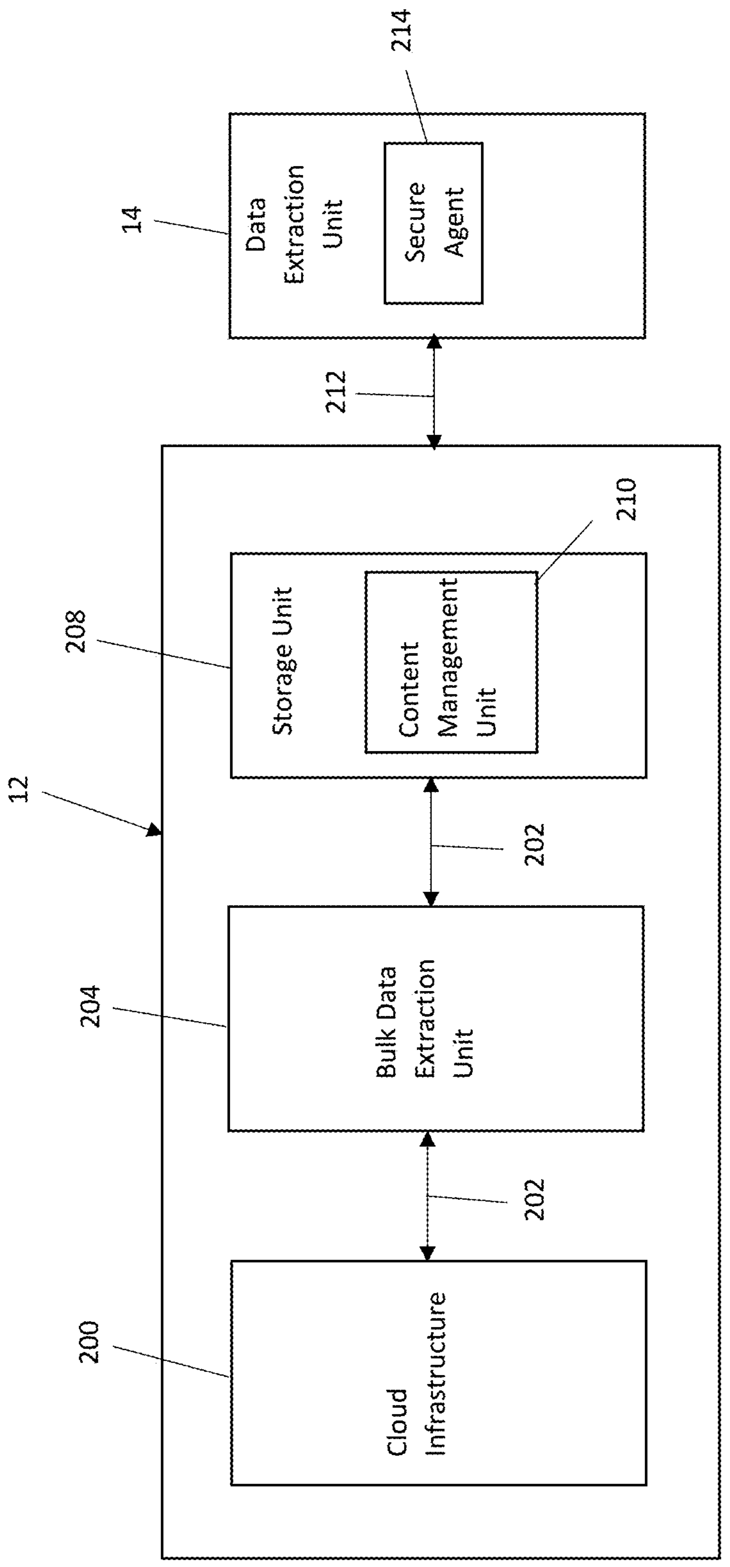
FIG. 10 is a schematic block diagram of a data source subsystem employed by the data aggregation and normalization system of FIG. 1 according to the teachings of the present invention.

The financial data from the data sources 12 can be provided from ERP systems that typically employ conventional databases and associated software applications to collect, manage and store the data. One conventional database and associated software system can include a multi-model relational database system or subsystem, such as the database system provided by Oracle Corporation, USA. The system of the present invention provides for an efficient and improved communication methodology for communicating information between the data source 12 and the data extraction unit 14. The illustrated data source 12 can include, according to another embodiment, one or more data source subsystems. As shown for example in FIG. 10, the data source subsystem 12 can be structured as a subsystem that includes, in a general sense, a cloud-based or digital storage infrastructure 200 that stores and/or extracts the data from the ERP systems, or which functions as the data sources. The cloud infrastructure 200 can refer to the underlying hardware and software components that comprise cloud computing services, such as data processing and storing services. The cloud infrastructure 200 can include one or more of servers, storage elements, networking equipment, databases, software applications including virtualization software, and other software tools and services that are needed to deliver cloud computing capabilities to offer the enterprise flexible resources and economies of scale. The main advantage of the cloud infrastructure 200 is that it allows the enterprise to access computing resources on demand, without the need to invest in and maintain their own hardware and software. The cloud infrastructure 200 thus eliminates the capital expense of buying hardware and software and setting up and running the equipment in on-site data centers that require racks of servers, around-the-clock electricity for power and cooling, and experts for managing the infrastructure. The cloud infrastructure 200 can be associated with conventional cloud hosting companies, such as Microsoft, Amazon, and Oracle cloud hosting services. The cloud infrastructure 200 can include, according to one embodiment, an Oracle based cloud infrastructure.

The data source subsystem 12 can also include a bulk data extraction unit 204 that can communicate with the cloud infrastructure 200 to schedule, manage and control the bulk transfer of business intelligence and other data 202 from the cloud infrastructure 200. The data 202 can be transferred from the cloud infrastructure 200, in bulk, having any selected data size. In an Oracle environment, the bulk data extraction unit 204 can correspond to or can include a business intelligence cloud connector (BICC), similar to the type implemented by Oracle. The bulk data extraction unit 204 can be an intelligent data extraction subsystem that can be employed to extract data efficiently from the cloud infrastructure 200, extract complete or partial data, run data extracts on-demand or schedule the data extracts to run at specified intervals, schedule multiple independent data extracts at convenient intervals, monitor data extracts and review associated data logs, and export configured offerings and associated data stores. A data extract can refer to the process of retrieving specific data or a subset of data from a database, data warehouse, or other structured data source, typically for the purpose of further analysis, reporting, or manipulation. The data extract can involve selecting and retrieving a subset of data that meets certain criteria or requirements, which can then be used for various analytical, operational, or decision-making purposes. The extracted data 202 can then be used for various purposes, such as data analysis, reporting, or migration. The process of creating a data extract can include specifying selected criteria or conditions for selecting the relevant data, such as specific columns, date ranges, or other types of filters. The data extract can also include any necessary transformations or formatting of the data. The data extracts can be performed using custom queries or using data extraction tools provided by database or software vendors. Alternatively, the data extracts can be scheduled and automated to run on a regular basis. The data extracts can be used in data warehousing and business intelligence applications to extract data from multiple different data sources and consolidate the data into one or more repositories for analysis and reporting. The data extracts can be used for the migration of data or the integration of data between different data systems. Overall, the data extracts provide a way to retrieve and work with a specific subset of data rather than managing the entire dataset. The bulk data 202 generated by the bulk data extraction unit 200 can be conveyed and stored in a storage subsystem or unit 208 for subsequent extraction and use. The storage subsystem 208 can employ any selected type of storage device, including one or more databases, for storing, managing and distributing the stored data. The storage subsystem 208 can also include a content management unit 210 for managing and controlling the extraction and storage of the data in the storage subsystem 208. The content management unit 210 can refer to a component within a system or subsystem that can be configured to manage and monitor the extraction, storage, and possible transformation of data. The control management unit 210 can control the processes involved in retrieving specific data from the data sources, such as from the cloud infrastructure 200, ensure data integrity during storage, and can facilitate data transformation into formats suitable for further analysis, reporting, or other uses. The control management unit 210 can assist in maintaining structured and organized data within the system, supporting efficient data management and utilization across various applications or operations.

The data source subsystem 12, via the content management unit 210, efficiently communicates with the data extraction unit 14 to organize and manage the extraction of data from the cloud infrastructure 200 to form an improved computer communication methodology. For example, instructions can be exchanged between the data extraction unit 14 and the data source subsystem 12, and specifically the content management unit 210, via any selected type of communication link or pathway 212, and the data stored in the storage subsystem 208 can be conveyed to or extracted by the data extraction unit 14. In order to facilitate the communication between the data extraction unit 14 and the data source subsystem 12, the data extraction unit 14 can include a task or secure agent 214 for securely managing and controlling the communication and the exchange of data therebetween. The secure agent 212 can be a specialized software component that is responsible for securely communicating with the content management unit 210 of a data source subsystem 12. The secure agent 214 can function as a local agent on the data extraction unit 14 that runs all appropriate tasks and is responsible for or facilitates the extraction or moving of data from the data source subsystem 12 to the data extraction unit 14. The secure agent facilitates the extraction of data while adhering to security protocols and ensuring data protection measures are upheld throughout the extraction process. The secure agent can implement authentication, encryption, and other security mechanisms to safeguard data as it is transferred or extracted from the data source 12 to the data extraction unit 14. The secure agent 214 also allows for the system to access all local resources, such as databases, storage, files and software applications in the data source 12. The secure agent 214 thus can help maintain data integrity and confidentiality during transmission and storage, thereby supporting secure and reliable data extraction operations within the system.

Figure 11:
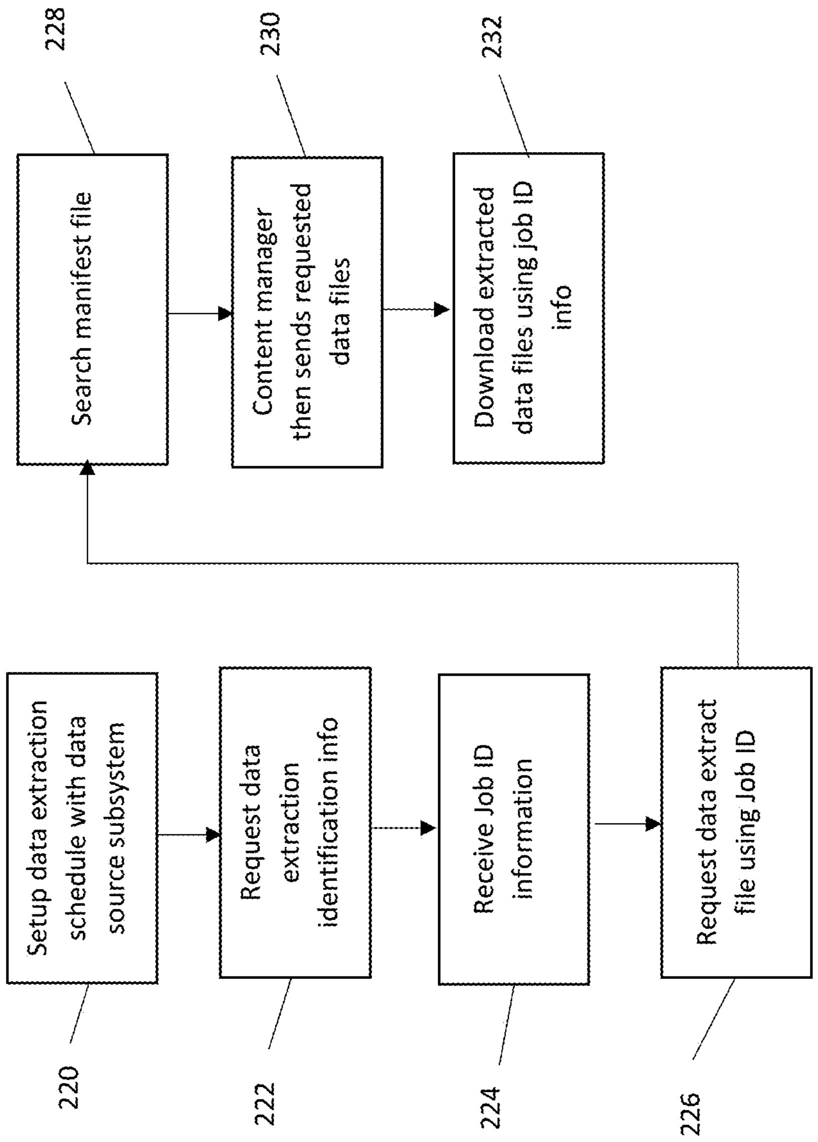
FIG. 11 is a schematic flow chart diagram illustrating the communication that occurs between the data source subsystem and the data extraction unit of the system of the present invention.

The communication sequence and methodology that occurs via the communication link 212 between the data source subsystem 12 and the data extraction unit 14 is shown, for example, in FIG. 11. The data extraction unit 14, via any suitable structure or agent, such as the secure agent 214, can communicate with the data source subsystem 12, and specifically with one or more of the data storage subsystems 208 and the bulk data extraction unit 204, to communicate a request to initiate or schedule a data transfer from the data source 12, step 220. Specifically, bulk data extraction unit 204, functioning for example as the BICC, can create a data model and generate a data extraction job or schedule with corresponding job identification (ID) information. The data extraction unit 14 can then request the job ID information from the content management unit 210, step 222, and the content management unit 210 can then convey or send the job ID information to the secure agent 214 of the data extraction unit 14, step 224. The job request can be automated so as allow the system to request data without performing an unnecessary series of log-in steps. The bulk data extraction unit 204 can also generate one or more status checks to determine the progress of the data extraction from the cloud infrastructure 200.

The data extraction unit 14 via the secure agent 214 can then generate a programmatic call operation using the job ID information to the content management unit 210 requesting the extracted data files, including a manifest file, corresponding to the bulk data, step 226. The data extraction unit 14 can also generate a search request for searching the manifest file for selected types of information, step 228. The manifest file can include information, such as metadata, associated with the extracted bulk data files that form part of a set or coherent unit of files. For example, the files of a computer program can have a manifest file describing the name, version number, license and the constituent files of the program. The content management unit 210 retrieves the manifest file from the bulk data extraction unit 204. The manifest file can list the extracted data files and any public view objects (PVOs) associated therewith. The PVOs are data objects that are accessible and viewable by other software applications in the system, and hence are accessible and viewable by the content management unit 210. The manifest file is then searched and parsed by the content management unit 210 to identify and retrieve the extracted data files corresponding to the job identification information. The content management unit 210 then sends the extracted data files to the data extraction unit 14, step 230. Specifically, the data extraction unit 14 employs the job ID information to communicate with the content management unit 210 so that the proper extracted bulk files are downloaded to or retrieved by the data extraction unit 14, step 232.

Figure 12:
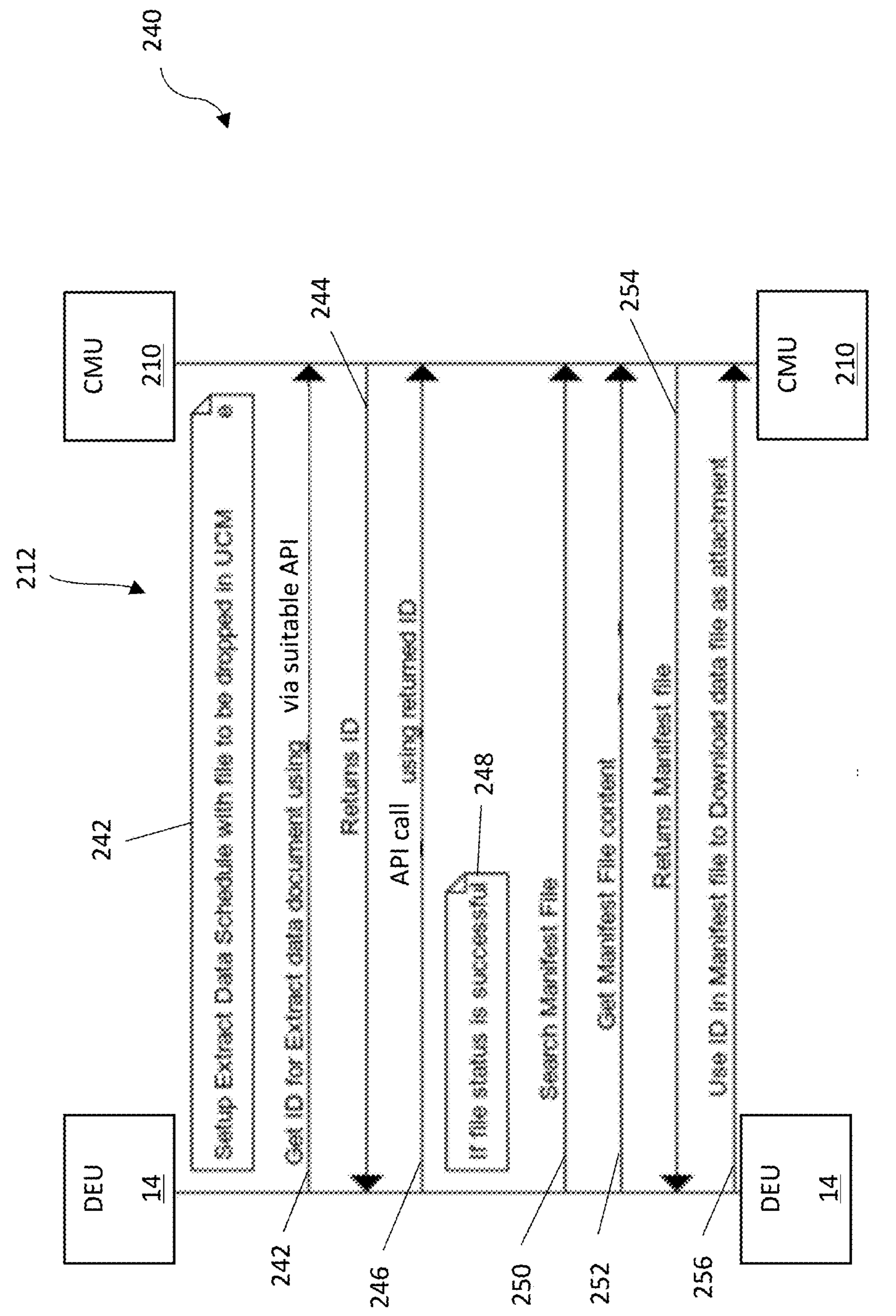
FIG. 12 is a data flow diagram illustrating the communication between the data source subsystem and the data extraction unit according to the teachings of the present invention.

FIG. 12 is an example data flow diagram 240 showing the flow of data and programmatic communications between the data source subsystem 12 and the data extraction unit 14 during a data transfer, such as a bulk data transfer. The software programmatic communications can involve the automated exchange of data, commands, or messages between software applications or system components using established protocols or application programming interfaces. This facilitates the seamless integration and interaction between different systems, enhancing interoperability and enabling efficient data sharing and processing across diverse software environments. According to one embodiment, the content management unit 210 of the storage subsystem 208 can be configured to communicate with the secure agent 214 of the data extraction unit 14. The secure agent 214 can initially communicate with the content management unit 210 to schedule the retrieval of bulk data from the source data subsystem 12. Specifically, the bulk data extraction unit 204 can create a data model and generate a data extraction job or schedule with corresponding job identification (ID) information. The secure agent 214 can then send a programmatic request to the content management unit 210 requesting job ID information associated with one or more bulk data files to be retrieved by the data extraction unit 14, step 242. The secure agent 214 can generally generate and send the search and retrieval request via any suitable application programming interface (API). The content management unit 210 can also determine the status of the bulk data retrieval request to ensure that the request is being properly handled prior to execution of a subsequent bulk data file request. The status checks determine the progress of the data extraction from the cloud infrastructure 200. The content management unit 210 can then convey the job ID information to the secure agent 214 in response to the programmatic request, step 244. The job request can be automated so as to allow the system to request data without performing any unnecessary log-in steps.

The data extraction unit 14 via the secure agent 214 can then generate a programmatic call operation using the job ID information, which is conveyed over the communication link 212 to the content management unit 210 requesting the data files associated with the bulk data, including a manifest file, step 246. The content management unit 210 then determines the status of the bulk data files, step 248. The data extraction unit 14 can also generate a programmatic search request for searching the manifest file for selected types of information, step 250. The manifest file is conveyed from the bulk data extraction unit 204 to the content management unit 210 of the storage subsystem 208 and includes information associated with the data files that is exported to the content management unit 210. Specifically, the manifest file can include information, such as metadata, associated with the data files. The secure agent 214 can also generate a programmatic request for the manifest file, step 252. When the programmatic call or request is received by the content management unit 210, the content management unit 210 retrieves the manifest file from the bulk data extraction unit 204 and then searches and parses the manifest file to identify and retrieve the data files corresponding to the job ID information. The content management unit 210 then sends the data files associated with the bulk data to the data extraction unit 14, step 254. Specifically, the data extraction unit 14 employs the job ID information from the manifest file to communicate with the content management unit 210 so that the proper bulk data files are downloaded to or retrieved by the data extraction unit 14, step 256.

The system of the present invention provides for an efficient and streamlined method for retrieving and downloading bulk data files from a cloud infrastructure 200, and especially the bulk data files stored in an Oracle type environment. The present invention enables and facilitates the automated and efficient communication, identification and management of extracted bulk data files for retrieval by the data extraction unit 14.

The user interface generator 60 can generate one or more user interfaces for allowing a user to initiate a bulk data transfer from the data source 12 to the data extraction unit 14. The user interface can include one or more suitable windows, panes and screens, as well as one or more fields or drop down menus, for managing and controlling the data transfer. The interfaces can employ suitable fields and/or drop down menus that can include a file name, data transfer frequency (e.g., daily, monthly, yearly, etc.), date, start time, service type, and the like.

Figure 13:
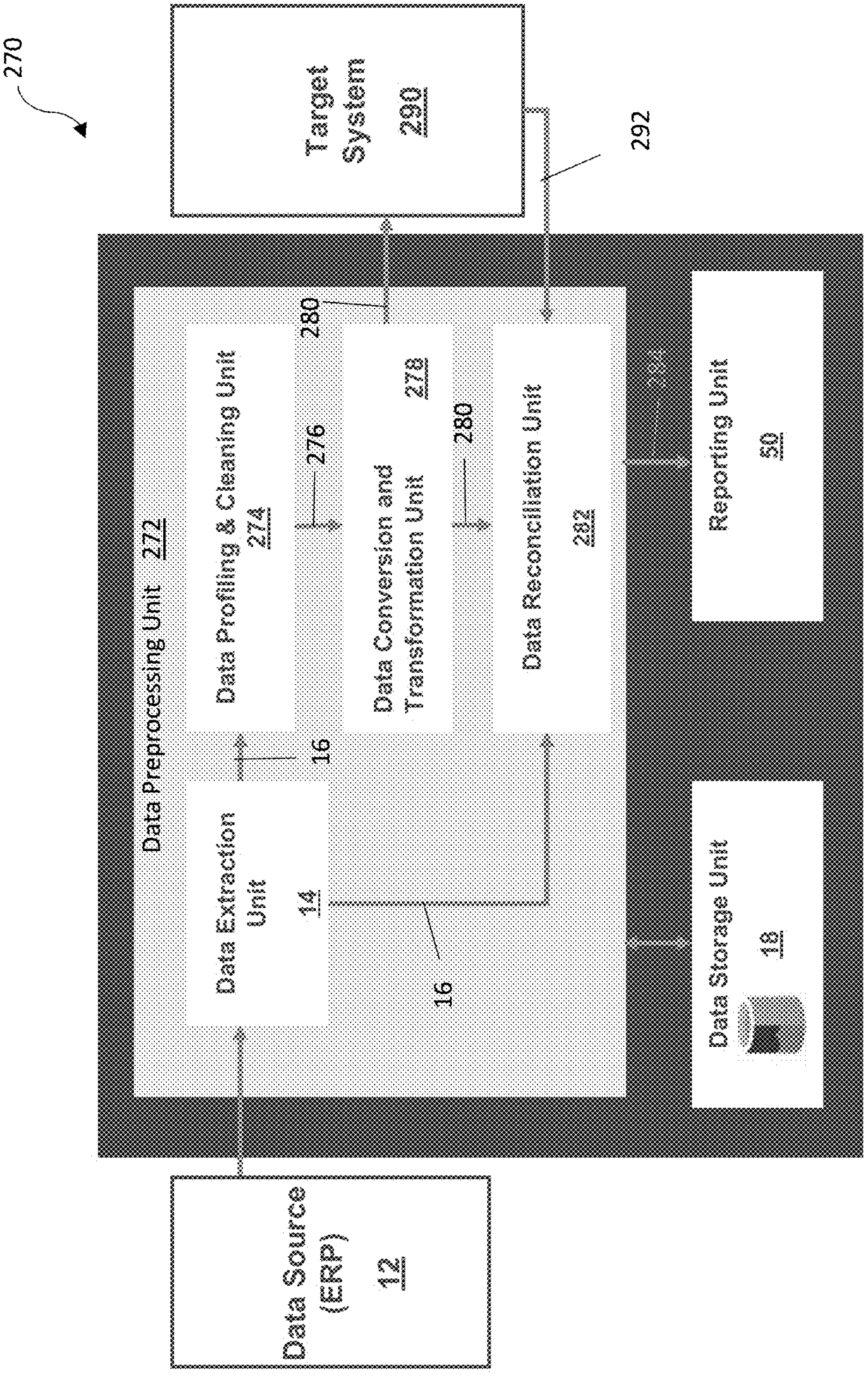
FIG. 13 is a schematic block diagram of the data aggregation and enrichment system according to the teachings of the present invention.

Another embodiment of the data aggregation and normalization system of the present invention is shown for example in FIG. 13. The illustrated data aggregation and normalization system 270 is similar to the data aggregation and normalization system 10 of FIG. 1, where like reference numerals indicate like units, modules and functionality. The illustrated data aggregation and normalization system 270 can be employed to migrate data, such as bulk data, from one data source or a data source subsystem to another data source or a data source subsystem in an easy, secure, structured, predictable, reliable, scalable and repeatable manner.

The data aggregation and normalization system 270 of the present invention receives source data from a variety of different data sources or data source subsystems 12. The data sources 12 can include data from data records generated and stored in a number of different systems that are managed by different types of software applications, including for example software applications from Oracle, Salesforce, SAP, and the like. One example of a data source is an ERP system. The data acquired by the data sources 12 can be conveyed through any suitable data connection, such as via a network, to the data extraction unit 14. The illustrated data extraction unit 14 can form part of a data preprocessing unit 272 or can be a separate unit. The illustrated data extraction unit 14 can extract, transform and load (ETL) the extracted data 16 into a data storage unit 18 or the extracted data 16 can be employed by the data preprocessing unit 272 prior to storage in the data storage unit 18. Specifically, the data extraction unit 14 is configured to copy the data from the data sources 12, transform the data by converting the file or format structure of the source data into another usable form or suitable format, and then load the data in the data storage unit 18 or provide the data to the data preprocessing unit 272. The data extraction unit 14 thus serves as one or more extract, transform and load (ETL) data pipelines between the data sources 12 and the data storage unit 18. Examples of a suitable ETL software application or system that can be employed to extract and load the data from the data sources 12 includes the ETL software platform from Informatica, USA.

The data storage unit 18 can be configured to store the extracted data 16 in any suitable form or format. The data storage unit 18 can be, in essence, a data lake, a data warehouse, or one or more specific databases. As such, the data storage unit 18 can be configured to store the extracted data 16 in a raw data format, usually as object blobs or files. The data storage unit 18 can also be configured to store data processed by the data preprocessing unit 272 in addition to the raw data. The data storage unit 18 can be constructed as a single data store for storing raw and processed data that can be subsequently used for tasks such as reporting, visualization, advanced analytics, machine learning, and the like. Alternatively, the data storage unit 18 can employ, according to one practice, multiple different data buckets that provides a place to store extracted data 16 (e.g., raw data), a place to store cleaned or preprocessed data, provides a workspace for AI/ML modeling processing and a storage area for machine language models, prediction units, and data associated therewith or generated thereby (e.g., trusted data). The data storage unit 18 can include structured data from relational databases (e.g., rows and columns), semi-structured data (e.g., CSV, logs, XML, JSON), unstructured data (e.g., emails, documents, PDFs), and/or binary data (e.g., images, audio, video). The data storage unit 18 can be implemented in any combination of hardware and software on premises (i.e., within the data centers of an enterprise), distributed between multiple different locations or premises, or can be hosted in the cloud using known cloud hosting services from vendors such as Amazon, Microsoft, Amazon, Google, and the like.

The data extraction unit 14 can also employ one or more common data models. The extracted data 16 can be used as data to populate the common data model to provide a comprehensive data framework and common interface for the extracted data, such as extracted bulk data. The common data model can serve to conform, organize, and normalize elements of data and standardize or normalize how the data elements relate to one another and to the properties of real-world entities. The data models can include a set of standardized, extensible data schemas that employ a defined set of data entities, data attributes, relationships, and semantic metadata (i.e., traits). The data entity can describe the structural shape and semantic meaning for records of the data. The entities can thus represent physical objects, locations, interactions, individuals, point-in-time measurements, data types, and the like. The entity can also describe the meaning and shape of the data through a set of attributes, which can include an atomic or simple attribute type and a more complex, composite attribute type. The common data model allows downstream applications to be able to use the data stored therein by providing a common, normalized, standardized, and shared data language for how the data elements relate to one another and to the properties of the real-world entities. The data extraction unit 14 can also employ one or more data workbooks for gathering the extracted data from the common data model and for populating one or more workbooks with relevant data. The workbooks can be structured as data tables that have selected columns and rows related to the types and categories of the extracted data. The data workbooks can be used to combine text, log queries, metrics, parameters, and the like for use by subsequent portions of the system. The workbooks can also be employed by the reporting unit 50 to generate reports and the like.

The illustrated data preprocessing unit 272 can communicate with the data extraction unit 14 for preprocessing and enriching the extracted data 16 for subsequent use by the data aggregation and normalization system 270. The data preprocessing unit 272 can be configured to pull the extracted data stored in the data storage unit 18 or to receive the extracted bulk data directly from the data extraction unit 14, and then perform a series of preprocessing and enrichment operations on the data. As shown for example in FIG. 13, the data preprocessing unit 272 can include a data profiling and cleaning unit 274 for initially profiling and cleaning selected portions of the extracted data 16. The profiler portion or subsystem of the data profiling and cleaning unit 274 can be configured to analyze and examine data from the data sources 12 to understand the structure, content, and quality of the data. The purpose of data profiling is to provide insights into the characteristics of the data, to identify data quality issues, and to assess the overall suitability of the data for selected purposes, such as data migration, data integration, or data analysis. During data profiling, various characteristics of the data are analyzed, including data types, data ranges, distribution patterns, data dependencies, and data relationships. Data profiling can also involve identifying missing or incomplete data, duplicates, inconsistencies, and other data quality issues that need to be addressed. The data profiling helps to ensure that the data is accurate, complete, and consistent. The data profiling and cleaning unit 274 analyzes and summarizes each attribute of the data and any unique values associated therewith. The profiler portion of the data profiling and cleaning unit 274 thus functions as a translator between the raw extracted data and numerically recognizable attributes of the data that the system can meaningfully use for interpretation. The different attributes that the profiler portion extracts from the data can be preconfigured or coded into the system so future enhancements to the profiler portion are relatively easy and straight forward.

The data profiling and cleaning unit 274 can also include a cleaning portion or subsystem that cleans the profiled extracted data by detecting and correcting inaccurate or incomplete data according to known techniques to form cleaned extracted data. The cleaning portion of the data profiling and cleaning unit 274 ensures that the data is accurate, valid, correct, complete, consistent, and uniform (e.g., cleaned). Specifically, data cleaning helps improve the accuracy, completeness, and consistency of the data, making the data more reliable and useful for analysis and decision-making. The cleaning portion can be configured to identify and remove any duplicate records in the data, correct spelling and formatting errors, ensure that the data is consistent in terms of spelling, formatting, and other aspects, identify missing data and take appropriate actions, such as imputing missing values or removing records with missing data, identify and handle any outliers or data points that are significantly different from the rest of the data, resolve any inconsistencies in the data, such as different spellings of the same name or conflicting data, and validate the data by ensuring that the data meets the required standards. The data profiling and cleaning unit 274 can also apply one or more business rules or logic to the data so as to enhance the profiling and cleaning of the data. The data profiling and cleaning unit 274 can then generate cleaned extracted data 276.

The data aggregation and normalization system 270 can also include a data conversion and transformation unit 278 that is configured to receive the cleaned extracted data 276 and apply thereto one or more conversion and transformation rules and logic associated with a target system 290. The data conversion and transformation unit 278 can be configured to convert data from one format or structure to another to ensure that the data is in a format that can be integrated with other data sources or target systems. The data conversion can involve mapping the data from a source format to a format associated with the target system 290 by identifying the source and target data structures and mapping the source data elements to corresponding data elements in the target system. The data conversion and transformation unit 278 can then transform the data from an original format to the target system format. This can involve manipulating the data, combining data from multiple different sources, or applying business rules and logic to ensure that the data is accurate and consistent. The data conversion and transformation unit 278 can also be configured to convey or load the transformed data into the target system 290. Data conversion is often required when data needs to be migrated from one system to another or when integrating data from multiple data sources. Data conversion can also be necessary when different systems or applications use different data formats, and the data needs to be converted to a common format for analysis or reporting. The conversion and transformation rules convert and load the data into a suitable format or template that is consistent with the data systems of the target system 290. The target system 290 represents the data systems of a target enterprise that is receiving the source data from the data sources 12. The data conversion and transformation unit 278 can then generate converted extracted data 280. The converted extracted data 280 is then conveyed to the target system 290. The converted extracted data 280 can be loaded into the data systems of the target system 290. The converted extracted data 280 can also be conveyed to a data reconciliation unit 282. The illustrated data reconciliation unit 282 is also configured to receive the target system data 292 from the target system 290, as well as the extracted data 16 from the data extraction unit 14. The data reconciliation unit 282 reconciles the data that is received from the data sources 12 with the cleaned and converted data that is loaded in the target system 290. Specifically, the data reconciliation unit 282 expedites reconciliation between pre-migration data (e.g., extracted data 16) and data 292 that is extracted, cleaned and converted, and then loaded in the target system 290. The data reconciliation unit 282 can be configured to identify discrepancies between the extracted source data 16 and the converted extracted data 280 that is loaded in the target system 290. More specifically, the data reconciliation unit 282 can be configured to compare and resolve inconsistencies between the extracted source data 16 and the target system data 292. In other words, the data reconciliation unit 282 is configured to verify that the data entered or loaded into the target system 290 is accurate and consistent relative to the extracted source data 16. The reconciliation process involves identifying discrepancies in the data by comparing the source data with the target data, resolving conflicts between the data, and ensuring that the data is reliable and consistent, so that decision-making processes based on the data can be trusted. The data reconciliation unit 282 can reconcile the data by identifying the various data sources that need to be reconciled. In the current system, the data sources include the extracted data 16, the target system data 292, and the converted data 280. The data reconciliation unit 282 can then aggregate the input data and then store the data in one or more data files or databases. Once the data is stored, the data reconciliation unit 282 can compare the data from each of the input sources to identify any discrepancies in the data. The data reconciliation unit 282 can resolve any discrepancies that are discovered in the data by updating the data in one or more of the input sources, such as for example, in the target system 290. The data reconciliation unit 282 can also be configured to investigate or monitor the cause of the discrepancy to determine which data is accurate. Once the discrepancies in the data are resolved, the data reconciliation unit can validate the data as being accurate and consistent across all data sources. The data reconciliation unit 282 can perform additional data checks or audits on the data to ensure that the data is reliable. The data reconciliation unit 282 can also be configured to monitor the input data to ensure that the data remains accurate and consistent across the various data sources. The data reconciliation unit 282 can generate reconciled data 284. The reconciled data 284 can be conveyed to the reporting unit 50, which can generate one or more suitable reports or user interfaces that display the reconciled data 284. The reporting unit 14 can also employ one or more dashboards to display metrics associated with the execution of the data migration. The dashboards can also compare data quality migration across multiple different data runs and the dashboards can be configured to display the progress of the overall data migration.

The user interface generator 60 of the reporting unit 50 can generate a series of custom interfaces or dashboards that allow for the visual visualization and display of data from the data aggregation and normalization systems. Examples of the user interfaces generated by the user interface generator 60 are set forth in Appendix A. The user interface generator 60 can generate user interfaces to display information associated with the data migration at any point along the data migration process. The unit user interfaces can display information suit associated with the data extraction, the data cleaning and profiling, the data conversion, the data reconciliation, or the data validation stages of the data migration process. This enables a user of the data aggregation and normalization system 272 view metrics associated with the data migration at any point along the data migration process.

According to another embodiment, the present invention can be directed to an analysis method to support and inform subject matter experts on data quality checks via a system that employs a set of analysis and/or association rules. As such, the system of the present invention can provide a rules-based subsystem that leverages one or more machine learning models, such as a generative language model, to monitor, process and provide insights on selected system parameters. The system can have an associated method for performing an analysis of the data based on a set of predefined or newly generated analysis and/or association rules. The method can be employed with the system 10 or 270, and preferably can be implemented between the data sources 12 and the data extraction unit 14 of the illustrated systems. The rules-based subsystem can be configured to have a number of different functionalities, including monitoring of system parameters, provide for event driven execution of selected data, polling of system data, collating of selected system data including log data, and then utilizing the system data (e.g., log data) to determine selected information therefrom.

The system of this embodiment of the present invention can thus utilize prestored rules or can generate or select rules based on the type of data being processed or can generate new rules based on new data. For association rules, the system can employ, for example, an apriori algorithm that can be utilized for association rule mining. The apriori algorithm can be configured to discover frequent itemsets in a dataset and generate association rules based on the itemsets. An itemset is considered frequent if the data meets a selected support threshold, which indicates a minimum percentage of transactions in which the itemset appears. For analysis rules, the analysis rules can be guidelines or principles that help in the process of discovering useful patterns, relationships, or insights from large datasets. The rules guide how data can be prepared, analyzed, and interpreted. The analysis rules can be used as a quality metric, and the association rules can support and inform expert rules. The analysis and association rules can be used to calculate or determine an anomaly score via any suitable scoring or rules-based unit.

The system can employ a machine learning model, such as a generative language model, to analyze the extracted data and to support data monitoring, data quality assessment, and data quality incident resolution. The system can thus serve to perform a quality check on the data and to create related data logs, create and employ data quality rules, and generate error messages to the model. The model can be trained on vector database with context on quality incidents.

The present invention is also directed to a system for determining a status of data along one or more data pipelines. The data processed by the systems 10, 270 initially starts at a data source, is processed by selected system components, and then insights are generated based on the data for subsequent display to an end user. The present invention provides for a system for determining the status of the data along a data pipeline by providing selected system waypoints along the data path, and for providing selected data pipeline information. The data flow path through the system 10, 270 and along a data pipeline can be defined by a selected series of data flow portions or stages. For example, a first data flow stage can include the data as it flows along the data pipeline from the data sources 12 to the data extraction unit 14. A second data flow stage can include the data as it flows along the data pipeline from the raw data extraction to the cleaning of the data by the data preprocessing unit 20. A third data flow stage can include the data as it travels along the data pipeline from the data preprocessing unit 20 to the reporting unit 50. One of ordinary skill in the art will readily recognize that the data flow path within the systems 10, 270 can include any selected number of data flow stages or portions. The system can provide selected pipeline information as the data flows along a selected data pipeline. For example, the pipeline information can include one or more of a pipeline identification (ID) information, data flow stage information, completion status information, and time related information (e.g., a timestamp). The system can employ suitable application programming interfaces (APIs) along each data flow stage that enables a system user to view and monitor the flow of the data along the data pipeline and to determine the status and location of the data. The APIs can store the location information of the data at each data flow stage.

It is to be understood that although the invention has been described above in terms of particular embodiments, the foregoing embodiments are provided as being illustrative only, and are not intended to limit or define the scope of the invention. Various other embodiments, including but not limited to those described herein are also within the scope of the claims and current invention. For example, the foregoing elements, units, modules, tools and components described herein may be further divided into additional components or sub-components or joined together to form fewer components for performing the same functions.

Any of the functions disclosed herein may be implemented using means for performing those functions. Such means include, but are not limited to, any of the components or units disclosed herein, as well as known electronic and computing devices and associated components.

The techniques described herein may be implemented, for example, in hardware, one or more computer programs tangibly stored on one or more computer-readable media, firmware, hardware or any combination thereof. The techniques described herein may be implemented in one or more computer programs executing on (or executable by) a programmable computer or electronic device having any combination of any number of the following: a processor, a storage medium readable and/or writable by the processor (including, for example, volatile and non-volatile memory and/or storage elements), an input device, an output device, and a display. Program code may be applied to input entered using the input device to perform the functions described and to generate output using the output device.

The term computing device or electronic device as used herein can refer to any device, such as a computer, smart phone, server and the like, that includes a processor and a computer-readable memory capable of storing computer-readable instructions, and in which the processor is capable of executing the computer-readable instructions in the memory. The terms electronic device, computer system and computing system refer herein to a system containing one or more computing devices that are configured to implement one of more units, modules, or components of the data aggregation and normalization system 10 of the present invention.

Embodiments of the present invention include features which are only possible and/or feasible to implement with the use of one or more computers or servers, processors, and/or other elements of a computer or server system. Such features are either impossible or impractical to implement mentally and/or manually. For example, embodiments of the present invention may operate on digital electronic processes which can only be created, stored, modified, processed, and transmitted by computing devices and other electronic devices. Such embodiments, therefore, address problems which are inherently computer-related and solve such problems using computer technology in ways which cannot be solved manually or mentally by humans.

Any claims herein which by implication or affirmatively require an electronic device such as a computer or server, a processor, a memory, storage, or similar computer-related elements, are intended to require such elements, and should not be interpreted as if such elements are not present in or required by such claims. Such claims are not intended, and should not be interpreted, to cover methods and/or systems which lack the recited computer-related elements. For example, any method claim herein which recites that the claimed method is performed by a computer, a processor, a memory, and/or similar computer-related element, is intended to, and should only be interpreted to, encompass methods which are performed by the recited electronic device or computer-related element(s). Such a method claim should not be interpreted, for example, to encompass a method that is performed mentally or by hand (e.g., using pencil and paper). Similarly, any product or computer readable medium claim herein which recites that the claimed product includes a computer, a processor, a memory, and/or similar computer-related element, is intended to, and should only be interpreted to, encompass products which include the recited computer-related element(s). Such a product claim should not be interpreted, for example, to encompass a product that does not include the recited computer-related element(s).

Embodiments of the present invention solve one or more problems that are inherently rooted in computer technology. For example, embodiments of the present invention solve the problem of how to determine the lineage of business terms and application interfaces between multiple software applications. There is no analog to this problem in the non-computer environment, nor is there an analog to the solutions disclosed herein in the non-computer environment.

Furthermore, embodiments of the present invention represent improvements to computer and communication technology itself. For example, the system 10 of the present can optionally employ a specially programmed or special purpose computer in an improved computer system, which may, for example, be implemented within a single computing device.

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive (read) programs and data from, and write (store) programs and data to, a non-transitory computer-readable storage medium such as an internal disk (not shown) or a removable disk. These elements can also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

Any data disclosed herein may be implemented, for example, in one or more data structures tangibly stored on a non-transitory computer-readable medium. Embodiments of the invention may store such data in such data structure(s) and read such data from such data structure(s).

It should be appreciated that various concepts, systems and methods described above can be implemented in any number of ways, as the disclosed concepts are not limited to any particular manner of implementation or system configuration. Examples of specific implementations and applications are discussed herein are primarily for illustrative purposes and for providing or describing the operating environment of the system of the present invention. The data aggregation and normalization system 10 and/or elements or units thereof can employ one or more electronic or computing devices, such as one or more servers, clients, computers, laptops, smartphones and the like, that are networked together or which are arranged so as to effectively communicate with each other. The network can be any type or form of network. The devices can be on the same network or on different networks. In some embodiments, the network system may include multiple, logically-grouped servers. In one of these embodiments, the logical group of servers may be referred to as a server farm or a machine farm. In another of these embodiments, the servers may be geographically dispersed. The electronic devices can communicate through wired connections or through wireless connections. The clients can also be generally referred to as local machines, clients, client nodes, client machines, client computers, client devices, endpoints, or endpoint nodes. The servers can also be referred to herein as servers, server nodes, or remote machines. In some embodiments, a client has the capacity to function as both a client or client node seeking access to resources provided by a server or server node and as a server providing access to hosted resources for other clients. The clients can be any suitable electronic or computing device, including for example, a computer, a server, a smartphone, a smart electronic pad, a portable computer, and the like. The system 10 or any associated units or components of the system can employ one or more of the illustrated computing devices and can form a computing system. Further, the server may be a file server, application server, web server, proxy server, appliance, network appliance, gateway, gateway server, virtualization server, deployment server, SSL VPN server, or firewall, or any other suitable electronic or computing device, such as the electronic device 300. In one embodiment, the server may be referred to as a remote machine or a node. In another embodiment, a plurality of nodes may be in the path between any two communicating servers or clients.

What is claimed is:

1. A computer-implemented data aggregation and enrichment system for enriching data, comprising
- a plurality of data source subsystems for providing data, wherein each of the plurality of data source subsystems includes
  - a data storage infrastructure for storing and extracting the data from a plurality of data sources,
  - a bulk data extraction unit for scheduling and controlling a bulk transfer of the data from the data storage infrastructure to form bulk data, and
  - a storage subsystem having a storage element for storing the bulk data and a content management unit for managing and controlling the extraction of the bulk data and for controlling the storage of the bulk data in the storage element,
- a data extraction unit having a secure agent for securely managing and controlling an exchange of the bulk data from the data storage infrastructure and for extracting selected portions of the bulk data from the plurality of data source subsystems to form extracted bulk data,
- a data storage unit for storing the extracted bulk data,
- a data preprocessing unit for processing and enriching the extracted bulk data to form cleaned bulk data that is stored in the data storage unit, and
- a reporting unit for generating one or more reports based on the cleaned bulk data having a selected reporting format.

2. The computer-implemented system of claim 1, wherein the secure agent generates a transfer request for transfer of the bulk data from the plurality of the data source subsystems, and in response to receiving the transfer request, the content management unit generates a bulk data extraction job for transfer of the bulk data having job identification (ID) information associated therewith, and then transfers the job ID information to the secure agent.

3. The computer-implemented system of claim 2, wherein the secure agent generates a programmatic call operation using the job ID information requesting a plurality of data files including a manifest file corresponding to the bulk data from one or more of the data source subsystems.

4. The computer-implemented system of claim 3, wherein the secure agent generates a search request for searching the manifest file for selected types of information.

5. The computer-implemented system of claim 4, wherein, in response to the search request, the content management unit retrieves the manifest file from the bulk data extraction unit.

6. The computer-implemented system of claim 5, wherein the content management unit is configured to search and to parse the manifest file to identify and to retrieve the plurality of data files corresponding to the job ID information, and then transfer the plurality of data files corresponding to the job ID information to the data extraction unit.

7. The computer-implemented system of claim 6, wherein the data preprocessing unit comprises a data cleaning unit for cleaning the extracted bulk data to form cleaned bulk data, a common data model unit for inserting the cleaned bulk data into a common data model to normalize the cleaned bulk data, an assessment unit for assessing a quality of the cleaned bulk data in the common data model, a machine language module having a plurality of predefined machine learning units for applying one or more selected machine learning techniques to selected portions of the cleaned bulk data to form machine language data, and a transformation unit for transforming the machine language data into the selected reporting format.

8. The computer-implemented system of claim 7, wherein the plurality of data source subsystems provide data that is generated by a plurality of different types of data systems that are managed by different types of software applications.

9. The computer-implemented system of claim 6, wherein the bulk data extraction unit comprises an intelligent subsystem for extracting the bulk data from the data storage infrastructure and for scheduling and running data extracts.

10. The computer-implemented system of claim 6, wherein the data preprocessing unit comprises a data profiling and cleaning unit for profiling and cleaning the extracted bulk data and for generating cleaned bulk data, a data conversion and transformation unit for converting and transforming the cleaned bulk data into a format suitable for loading into a target system and for generating transformed data, and a data reconciliation unit for reconciling the extracted bulk data with the transformed data loaded into the target system.

11. The computer-implemented system of claim 10, wherein the data preprocessing unit comprises a machine language module having a plurality of predefined machine learning units for applying one or more selected machine learning techniques to selected portions of the bulk data to form machine language data.

12. The computer-implemented system of claim 11, wherein the cleaned bulk data includes transaction data, product data, and user data, wherein the machine language module further comprises a prediction unit for processing the transaction data and the user data and generating a prediction based on an interest in one or more selected products of a selected user, wherein the prediction unit includes a filter unit for processing the transaction data and the user data and for generating a product interest score indicative of the interest in the one or more selected products by the selected user, wherein the filter unit includes a pattern filter unit for identifying from the transactional data a set of users having similar product preferences to the selected user and for generating based thereon a first product interest score indicative of a first interest level in the product by the selected user, a neuro pattern filter unit for identifying from the transactional data and the user data a set of users having similar product preferences to the selected user and for generating based thereon a second product interest score indicative of a second interest level in the product by the selected user, a page rank unit for processing the product data and the user data and for generating therefrom a community interest score associated with the one or more selected products, a user feature extraction unit for processing the user data and for identifying and extracting one or more primary user features based on the user data having a user feature score associated therewith, a product feature extraction unit for processing the product data and for identifying and extracting one or more primary product features based on the product data having a product feature score associated therewith, a scoring unit for receiving and processing the first product interest score, the second product interest score, the community interest score, the user feature score, and the product feature score to determine therefrom a final product score indicative of the user interest in the one or more selected products, and a ranking unit for ranking the final product interest scores.

13. The computer-implemented system of claim 12, wherein the machine language module further comprises an anomaly detection unit for detecting one or more anomalies in the bulk data, wherein the anomaly detection unit includes a segmentation unit for segmenting the cleaned bulk data into a plurality of data segments, an entropy determination unit for determining entropy values for each of the plurality of data segments and for determining a plurality of distributions of the entropy values, an entropy change determination unit for comparing each of the plurality of distributions of the entropy values with each of the remaining ones of the plurality of distributions of the entropy values and for determining therefrom a change in the entropy value of each of the plurality of data segments relative to each other to form a plurality of distributions of entropy change values, an entropy selection unit for analyzing and selecting one or more distributions of entropy change values that trend in an upward direction, wherein the entropy change values correspond to one or more anomalies, and a removal unit for identifying selected ones of the plurality of distributions of entropy change values that are identical to each other, clustering together the identical ones of the plurality of distributions of entropy change values, and then removing duplicates of the identical ones of the plurality of distributions of entropy change values.

14. A computer-implemented method for enriching data with a data aggregation and enrichment system, comprising providing a plurality of data source subsystems for providing data, wherein each of the plurality of data source subsystems includes a data storage infrastructure for storing and extracting the data from a plurality of data sources, a bulk data extraction unit for scheduling and controlling a bulk transfer of the data from the data storage infrastructure to form bulk data, and a storage subsystem having a storage element for storing the bulk data and a content management unit for managing and controlling the extraction of the bulk data and for controlling the storage of the bulk data in the storage element, securely managing and controlling an exchange of the bulk data from the data storage infrastructure with a data extraction unit having a secure agent, and for extracting selected portions of the bulk data from the plurality of data source subsystems to form extracted bulk data, storing the extracted bulk data in a data storage unit, processing and enriching the extracted bulk data with a data preprocessing unit to form cleaned bulk data that is stored in the data storage unit, and generating one or more reports from the cleaned bulk data having a selected reporting format with a reporting unit.

15. The computer-implemented method of claim 14, comprising generating a transfer request with the secure agent for transferring the bulk data, in response to the transfer request, generating a bulk data extraction job having a job identification (ID) information associated therewith with the content management unit for transferring the bulk data, and then transferring the job ID information to the secure agent.

16. The computer-implemented method of claim 15, wherein generating, with the secure agent, a programmatic call operation using the job ID information requesting a plurality of data files including a manifest file corresponding to the bulk data.

17. The computer-implemented method of claim 16, generating, with the secure agent, a search request for searching the manifest file for selected types of information.

18. The computer-implemented method of claim 17, further comprising, in response to the search request, retrieving the manifest file from the bulk data extraction unit with the content management unit.

19. The computer-implemented method of claim 18, further comprising searching and parsing the manifest file, with the content management unit, to identify and retrieve the plurality of data files corresponding to the job ID information, and transferring the plurality of data files associated with the job ID information to the data extraction unit.

20. The computer-implemented method of claim 19, further comprising, with the data preprocessing unit, cleaning the extracted bulk data to form cleaned bulk data, inserting the cleaned bulk data into a common data model to normalize the cleaned bulk data, and assessing a quality of the cleaned bulk data in the common data model.

21. The computer-implemented method of claim 20, further comprising providing a plurality of predefined machine learning units for applying one or more selected machine learning techniques to selected portions of the cleaned bulk data to form machine language data, and transforming the machine language data into the selected reporting format.

22. The computer-implemented system of claim 19, further comprising, with the data preprocessing unit, profiling and cleaning the extracted bulk data and generating cleaned bulk data, converting and transforming the cleaned bulk data into a format suitable for loading into a target system and for generating transformed data, and reconciling the extracted bulk data with the transformed data loaded into the target system.

23. A computer-implemented method for communicating information in a data enrichment system, wherein the data enrichment system includes a plurality of data source subsystems for providing data, wherein each of the plurality of data source subsystems includes a data storage infrastructure for storing and extracting the data from a plurality of data sources, a bulk data extraction unit for scheduling and controlling a bulk transfer of the data from the data storage infrastructure to form bulk data, a storage subsystem having a storage element for storing the bulk data and a content management unit for managing and controlling the extraction of the bulk data and for controlling the storage of the bulk data in the storage element, the method comprising extracting with a data extraction unit having a secure agent selected portions of the bulk data by:

generating, with the secure agent, a transfer request for transfer of the bulk data, generating, with the content management unit, a bulk data extraction job having a job identification (ID) information associated therewith in response to the transfer request and then transferring the job ID information to the secure agent, generating a programmatic call operation using the job ID information with the secure agent requesting a plurality of data files including a manifest file corresponding to the bulk data, generating with the secure agent a search request for searching the manifest file for selected types of information, retrieving the manifest file with the content management unit from the bulk data extraction unit in response to the search request, searching and parsing the manifest file with the content management unit to identify and retrieve the plurality of data files corresponding to the job ID information, and transferring the plurality of data files associated with the job ID information with the content management unit to the data extraction unit, and storing the extracted data in a data storage unit.

24. The computer implemented method of claim 23, further comprising, with a data preprocessing unit, profiling and cleaning the extracted bulk data and generating cleaned bulk data, converting and transforming the cleaned bulk data into a format suitable for loading into a target system and for generating transformed data, and reconciling the extracted bulk data with the transformed data loaded into the target system.

* * * * *